United States Patent [19]
Zelikovitz et al.

[11] Patent Number: 5,555,478
[45] Date of Patent: Sep. 10, 1996

[54] FIBER OPTIC INFORMATION TRANSMISSION SYSTEM

[76] Inventors: Joseph Zelikovitz, deceased, late of Grove, Okla.; by Bernard Greenblott, executor, 373 Wildwood La., Deerfield Beach, Fla. 33442; by Jerry L. Owen, executor, 3933 Hartline, Del City, Okla. 73115

[21] Appl. No.: 471,827
[22] Filed: Jun. 7, 1995
[51] Int. Cl.$^6$ ............... H04J 14/00; H04B 10/00
[52] U.S. Cl. ............... 359/118; 359/117; 359/164; 370/94.3; 370/60.1; 340/826
[58] Field of Search ............... 359/117, 119, 359/125, 137, 164, 165, 167, 118; 370/94.3, 60, 60.1, 94.1, 94.2; 340/825.02, 825.03, 826

[56] References Cited

U.S. PATENT DOCUMENTS

| | | | |
|---|---|---|---|
| 4,380,063 | 4/1983 | Janson et al. | 370/60 |
| 4,399,531 | 8/1983 | Grande et al. | 370/60 |
| 4,516,272 | 5/1985 | Yano | 359/164 |
| 4,731,878 | 3/1988 | Vaidya | 359/117 |
| 4,797,882 | 1/1989 | Maxemchuck | 370/94 |
| 5,043,938 | 8/1991 | Ebersole | 340/825.03 |
| 5,175,733 | 12/1992 | Nuggent | 370/94.3 |
| 5,381,404 | 1/1995 | Sugano et al. | 370/13 |
| 5,491,692 | 2/1991 | Gunner et al. | 370/94.3 |

*Primary Examiner*—Leo Boudreau
*Assistant Examiner*—Rafael Bacares
*Attorney, Agent, or Firm*—Richards, Medlock & Andrews

[57] ABSTRACT

A unique fiber optic network with shunting routing devices strategically placed on the fiber optic matrix. These shunting devices divert the packeted information through the network to the intended subscriber. Emergency back-up and alternative routes are provided for in the system.

20 Claims, 11 Drawing Sheets

Subscriber (home or office)
(eg. 40, 43, etc.)

Line card at subscriber location
(eg. 90, 95, etc.)

Intelligent communications platform (shared)
(eg. 80, 85)

Intelligent line module
(eg. 25, 30)

Intelligent routing card
(eg. 35)

5,555,478

FIBER OPTIC INFORMATION TRANSMISSION SYSTEM

TECHNICAL FIELD OF THE INVENTION

A fiber optic information transmission system.

BACKGROUND OF THE INVENTION

Information transmission currently includes the transmission of voice and video signals, as well as other digital information to and from home/offices. Home/offices are usually described as subscribers to the transmission system. Traditional methods of information transmission include the use of central office switching, local loops, cable and cable farms, and dedicated wire pair transmission. Digital transmission of information and the use of fiber optic networks are also known in the art. The use of these new technologies in handling transmission of information, however, has yet to be optimized into an effective and efficient system.

SUMMARY OF THE INVENTION

The present invention combines the benefits of fiber optic cable transmission (such as a very large bandwidth) into a new distribution network. This invention eliminates the need for traditional information transmission concepts, such as local loops, cable and cable farms, central office switching, and main distribution frames. The result of this invention is an effective and efficient system.

This invention places an enhanced line card with the station set at the subscriber location and utilizes a new distribution matrix of fiber optic cables. Routing devices strategically placed on this matrix of fiber optic cables shunt packeted information to the intended destination throughout the fiber optic cable matrix. These shunting devices are known as shared intelligent communication platforms (ICP), intelligent line modules (ILM), and intelligent routing cards (IRC). Simultaneous transmissions are capable of being supported by the fiber optic cables. This sharing of the fiber optic cable is accomplished using transmission packets of information such as voice, data, fax or video transmitted at different frequencies. This sharing of the fiber optic cables in the network eliminates the inefficiencies of dedicated wire pairs to an individual subscriber.

Computers are used to interface with the fiber optic network in order to support communication with other fiber optic networks, international communication networks, or networks not using the same transmission system as described in this invention. These computers also keep track of billing information and toll calculations for subscribers on the network. A back-up system and emergency backup routes are used in this information transmission network to minimize the possibility of transmission failures and maximize the throughput of the network.

Through the novel configuration of the shunting devices on the unique fiber optic matrix, the invention establishes a digital information network having a very high capacity and numerous alternative routes in case of emergencies or device failures.

DETAILED DESCRIPTION

The invention is described in its preferred embodiment as a fully implemented system of fiber optic cables and routing devices. It is understood, however, that the invention may be implemented as an incremental migration path from the old transmission system to a full implementation of the invention, and that the invention could be configured to effectively communicate with other communication systems. The invention is easily expandable to handle increased capacity by increasing the bandwidth of the devices.

Layout of Fiber Optic Matrix

Figure 1A:
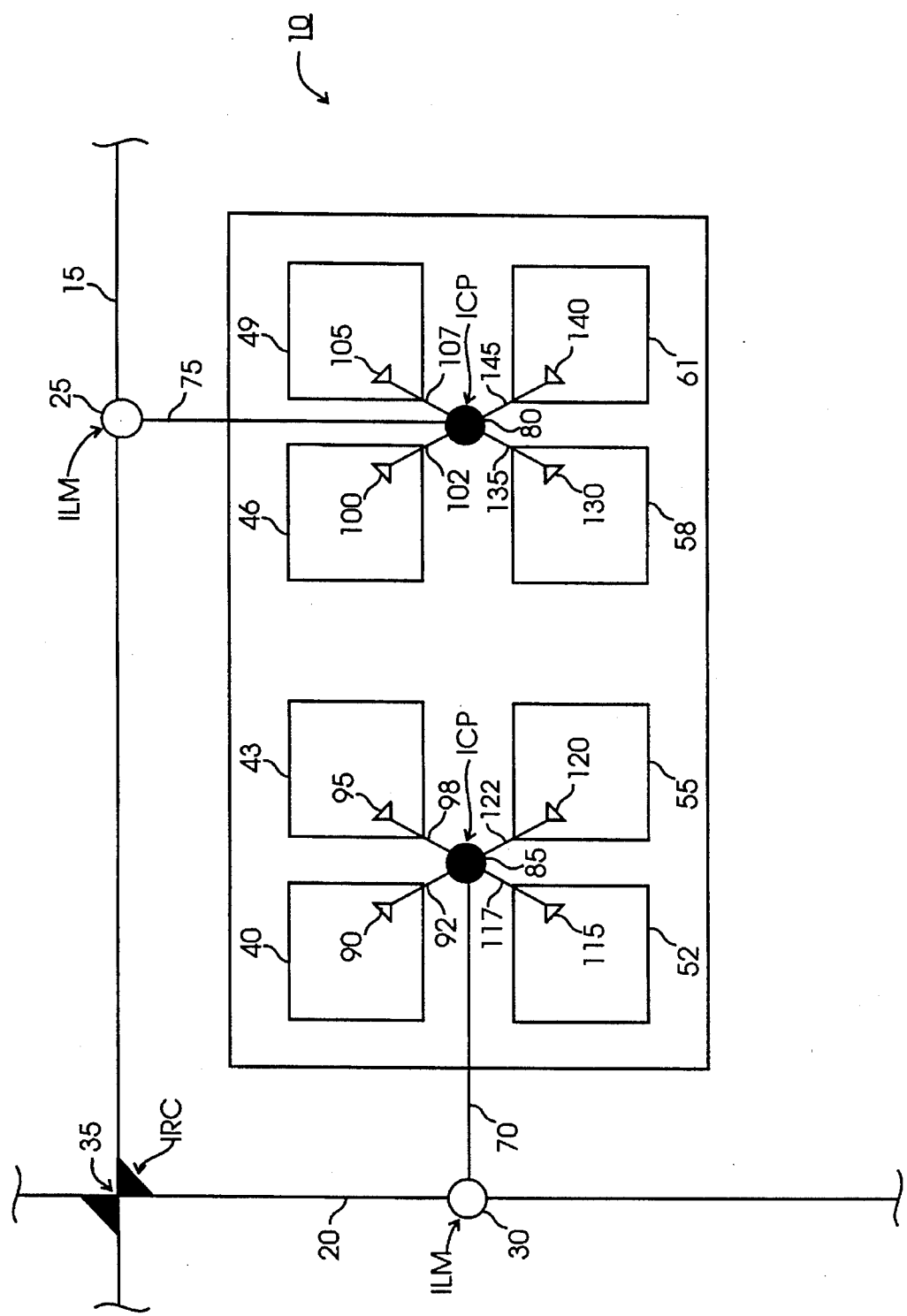
FIG. 1A is an example of eight (8) subscribers linked to two (2) fiber optic cables in the fiber optic network.

As shown in FIG. 1A, eight subscribers 40, 43, 46, 49, 52, 55, 58 and 61 are coupled to the fiber optic network. Four subscribers 40, 43, 52 and 55 are coupled to the same intelligent communications platform (ICP) 85, while the other four subscribers 46, 49, 58 and 61 are coupled to the same ICP 80. Subscriber 40 uses line card 90 which is coupled through the line 92 to the ICP 85. ICP 85 is coupled to the intelligent line module (ILM) 30 through line 70. The ILM 30 couples line 70 and ICP 85 to the fiber optic line 20.

Subscriber 43 uses line card 95 which is coupled through line 98 to the ICP 85. Subscriber 55 uses line card 120 which is coupled through line 122 to the ICP 85. Subscriber 52, likewise, uses a line card 115 coupled through line 117 to the ICP 85.

The subscribers 40, 43, 55, and 52 share the ICP 85 which directionally shunts transmission signals to and from the subscribers onto the fiber optic network. As each caller receives or transmits information, the ICP 85 will directionally divert the information to and from the intended subscriber.

Subscriber 46 is coupled to ICP 80 which is coupled through line 75 to the ILM 25. The ILM 25 couples ICP 80 to the fiber optic line 15 through the line 75. Subscriber 49 uses line card 105 which is coupled to ICP 80 through line 107. Subscriber 61 uses line card 140 which is coupled to the ICP 80 through line 145. Subscriber 58, likewise, uses line card 130 which is coupled to the ICP 80 through line 135.

The ILMs 30 and 25 shunt packeted transmissions to and from the ICPs 85 and 80, respectively. The data shunted onto the fiber optic cable lines 20 and 30 is communicated to an intelligent routing card (IRC), such as IRC 35. The IRC 35 shunts the packeted transmission into the appropriate direction depending upon its intended destination.

Figure 1B:
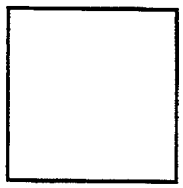
FIG. 1B describes the symbols used in the accompanying figures.
Figure 1B:
Figure 1B:
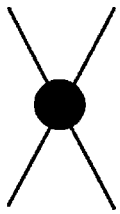
Figure 1B:
Figure 1B:
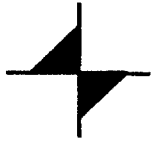

FIG. 1B shows the symbols used to designate the subscriber (eg. 40, 43), the line card of the subscriber (e.g. 90, 95) and the ICP (eg. 80, 85) which is shared by the group of four subscribers. Further symbols are indicated for the ILM (eg. 25, 30) and the IRC (eg. 35) on the fiber optic network.

Figure 2A:
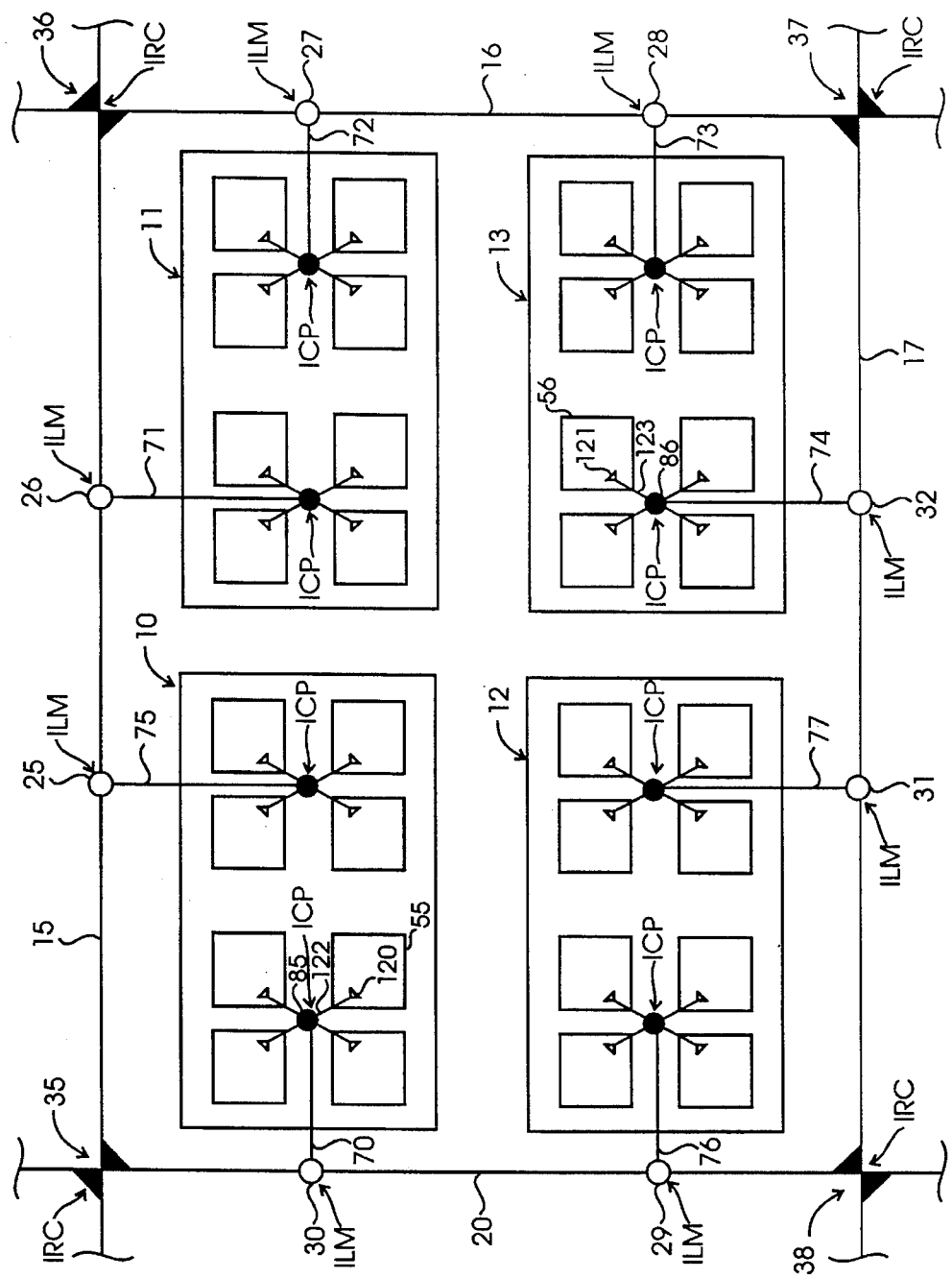
FIG. 2A is an example of thirty two (32) subscribers linked to four (4) fiber optic cables in the fiber optic network.

FIG. 2A discloses a larger group of subscribers on the fiber optic network. The group of eight subscribers 10 shown in FIG. 1 is also shown in FIG. 2A without the reference numerals particularly denoting each subscriber, line card or ICP. The group of eight subscribers shown in 11, 12 and 13 are similar to the first group of eight subscribers 10.

Also, specifically shown in FIG. 2A is the subscriber 55, line 122 and ICP 85. ICP 85 is coupled to ILM 30 through line 70. Line 70 couples some of the subscribers in group 10 to fiber optic line 20 through ILM 30. Line 75 couples other subscribers in group 10 to the fiber optic line 15 through ILM 25. Line 71 couples some of the subscribers in group 11 to the fiber optic line 15 through ILM 26. Line 72 couples other subscribers in group 11 to the fiber optic line 16 through ILM 27. Line 73 couples some of the subscribers in group 13 to the fiber optic line 16 through ILM 28. Line 74 couples other subscribers in group 13 to the fiber optic line 17 through ILM 32. Line 77 couples some of the subscribers in group 12 to the fiber optic line 17 through ILM 31. Line 76 couples the other subscribers in group 12 to the fiber optic line 20 through ILM 29. The lines connecting the ILM to the ICP, as well as the ICP to the enhanced line cards, will be fiber optic cables in the preferred embodiment.

IRC 35 is located at the intersection of fiber optic cable 15 and fiber optic cable 20. IRC 36 is located at the intersection of fiber optic cable 15 and fiber optic cable 16. IRC 37 is located at the intersection of fiber optic cable 16 and fiber optic cable 17. IRC 38 is located at the intersection of fiber optic cable 17 and fiber optic cable 20.

Figure 2B:
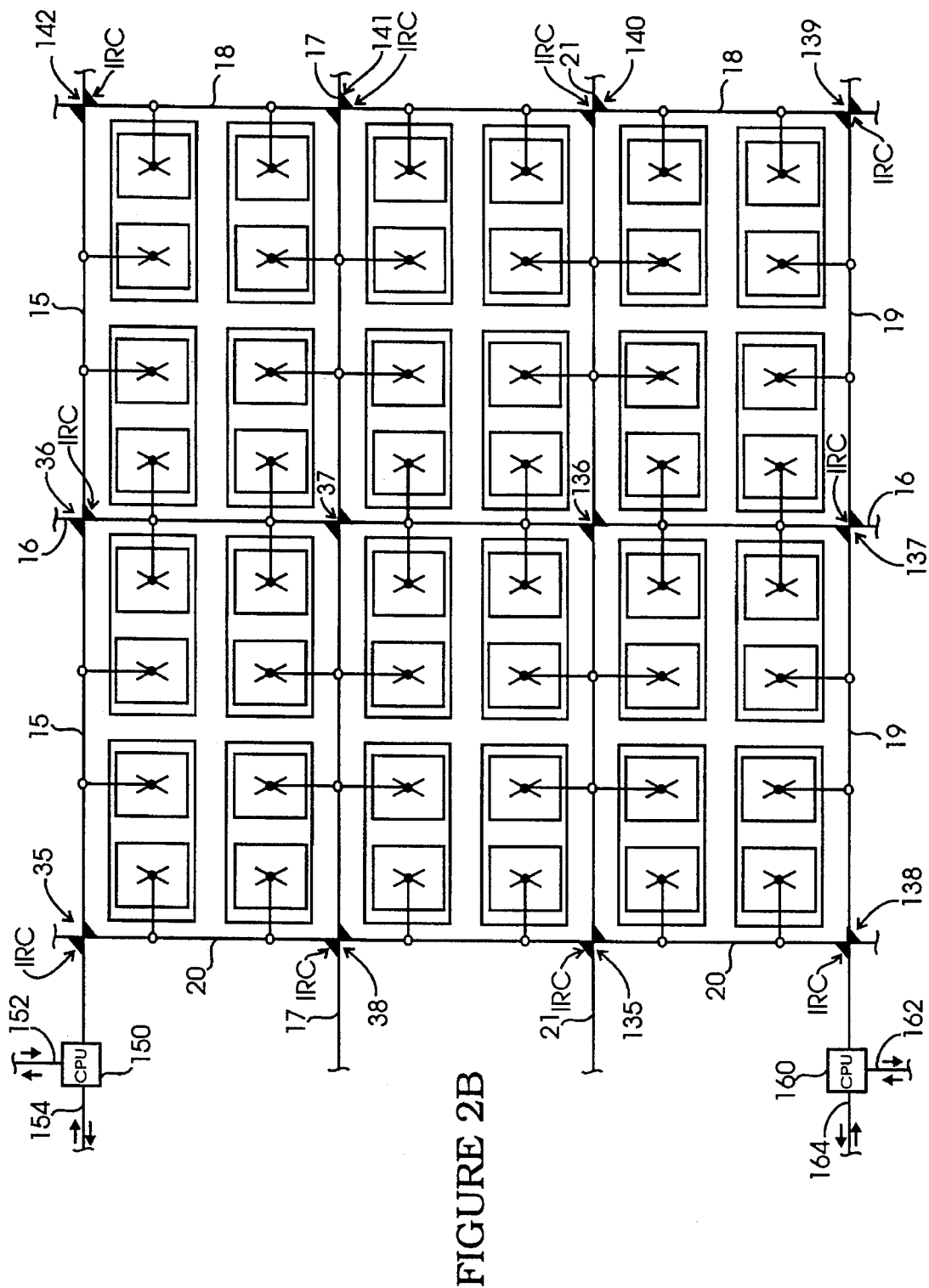
FIG. 2B is a larger group of subscribers in the fiber optic network.

As shown in FIG. 2B, the fiber optic cable matrix has been expanded to show other subscribers and routing devices. Other IRCs include IRCs 135, 136, 137, 138, 139, 140, 141 and 142. These IRCs and the remainder of the matrix supplement the prior elements shown in FIG. 2A. This group of subscribers shown in FIG. 2A is also shown in FIG. 2B and is surrounded by the fiber optic cables 15, 16, 17 and 20. Further, IRCs 35, 36, 37 and 38 surround this group of subscribers in the fiber optic network. Below IRCs 35 and 38 on fiber optic line 20 are IRCs 135 and 138. Below IRCs 16 and 37 on fiber optic line 16 are IRCs 136 and 137. Fiber optic cable 18 is coupled fiber optic cable 15 at the IRC 142. Below IRC 142 on fiber optic cable 18 is IRCs 141, 140 and 139. Each of the IRCs 35, 36, 142, 38, 37, 141, 135, 136, 140, 138, 137, 139 is located at the intersection of two fiber optic cables. In between each pair of routing cards are two ILMs located on the fiber optic line. Each ILM is coupled to at least one set of subscribers, but may be coupled to two discrete groups of subscribers.

The IRCs 138 and 35 are coupled to central processing units 162 and 150, respectively. CPU 150 communications to other fiber optic networks through communication lines 152 and 154. In an emergency situation, CPU 160 communicates to other fiber optic networks through communication lines 160 and 164. CPU 160 can be used as a back-up to the CPU 150 in the event the CPU 150 fails to perform as desired. Further, in high-load situations, CPU 160 can be used to decrease the load on CPU 150 and add to the throughput of the system.

CPU's coupled to the fiber optic matrix will support a database for billing and account information for each subscriber. Toll billing will also be determined by these types of CPUs which interface the local area with the long distance network. Further, these CPUs can detect defects in equipment to notify the supervisor system that repairs are needed to the system. The CPUs would also be capable of translating the transmission to an appropriate format to allow communication with other systems, such as older telephone systems or international systems.

While a grid matrix of fiber optic cables is shown, it is understood that a non-grid neighborhood or an urban area with numerous users on the same topological area could be supported by the invention. That is, the concepts described herein are not limited to a grid-type neighborhood, but could be equally applied to other configurations of neighborhoods.

Packet Transmission of Information

Information is transmitted in the system using a packeted data format. As the information is received by the line card, the data is manipulated into a data packet. Header and tail information is appended to the data packet forming a full transmission packet. The header information contains all the necessary routing and destination information to instruct the routing devices about the proper route for the information packet, as well as other information such as arrival time, completion time and charging data. The header information will also designate whether the call is a long distance, out-of-local area or local call.

The transmission packet may comprise voice, fax, video or any other type of data. The device forming the transmission packet, usually the enhanced line card (discussed in this application as a "line card" or a line card/individual intelligent communication platform combination) will accept a data over a predetermined period of time. Usually the predetermined period of time is of the order of microseconds, and may depend on the type of data being transmitted. Regardless, the line card will collect data over a predetermined period of time and manipulate the collected data into a data packet. Because of the relative small increment of time designated for collecting data, there is no perceptible delay in the transmission of data, especially in voice calls where delays and pauses on the line are much longer than the collection times of the data. The line card described herein is not the line card in a traditional phone system. The line card herein is capable of data processing, such as collecting appropriate data transmissions from the subscriber and appending sufficient header and tail information to allow proper routing of the transmission packet.

The transmission packet is transmitted by the line card to the ICP, ILMs and IRCs to allow the transmission packet to be shunted through the fiber optic matrix. The header information of each packet will designate how the transmission packet is to be transferred through the matrix to the intended destination. Each routing device will use the routing information to shunt the transmission packet in the appropriate direction.

Different transmission packets from different transmissions would be transmitted at different frequencies on the fiber optic line allowing the simultaneous transmission of transmission packets in different or corresponding directions on the same fiber optic line. Essentially, the fiber optic line provides a tremendous number of pathways for the transmission of transmission packets of information in the same or opposite directions. It is evident that there are immediate benefits in terms of capacity of using a shared fiber optic line capable of supporting a multiple of simultaneous users over using a dedicated wire line pair in the old transmission system.

Each subscriber on the network has a particular destination number. The routing information in the header of the transmission packet will include this destination number, as well as other routing information such as area code or any other destination prefix necessary for the routing device to calculate the most efficient route for the transmission packet. When a routing device receives a transmission packet, the routing device will use its own topological relationship with respect to other routing devices to route the transmission packet to the next most appropriate routing device. The first transmission packet in a transmission stream would be transmitted along the network and would set the routing devices to look for other transmission packets in the same transmission stream. As such, the initial transmission packet in a transmission stream would effectively set the routing devices so that they may direct related data packets to the same destination along the same route. The last data packet in the stream of data packets will be recognizable based on information in the tail data and will re-set the routing devices to their initial state.

Each shunting operation is controlled by the routing device such that a transmission packet is received and analyzed and directed only upon the next appropriate fiber optic line. The transmission of the transmission packets will not normally be done in a broadcast fashion. That is, the shunting of the transmission packet occurs after the routing determination and only occurs on the selected line needed to route the transmission.

Operation of the Intelligent Routing Card (IRC)

Figure 3A:
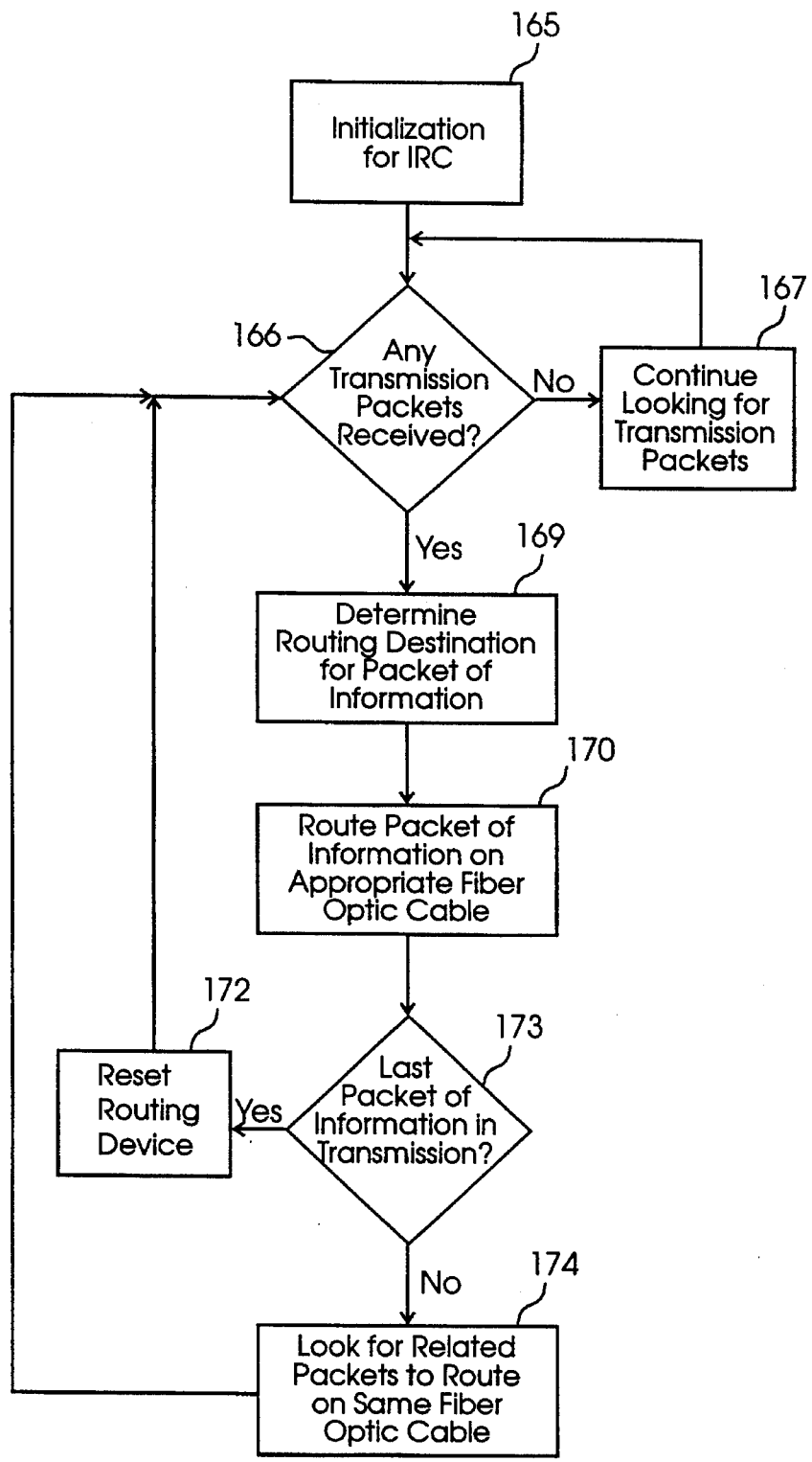
FIG. 3A is a flow chart for the operation of an intelligent routing card.

FIG. 3A discloses the flow chart operation for the intelligent routing card (IRC) such as IRC 35, 36, 37 or 38. In step 165 the IRC is initialized. Initialization includes determining through a handshaking procedure which components and routing devices are coupled to the adjacent nodes on the network. That is, the IRC should determine the identity in a topological sense of all IRCs, ILMs, and ICPs coupled to the fiber optic lines most directly coupled to the IRC. This would include the identification of the nearest IRC coupled on the fiber optic lines and all ILMs and ICPs coupled to the fiber optic line segment between the IRCs. For instance, IRC 37 in FIG. 2B needs to find out and maintain in memory all the ILMs and ICPs located on the fiber optic line segments between IRC 37 to IRC 141, IRC 37 to IRC 36, IRC 37 to IRC 38 and IRC 37 to IRC 136.

After step 165, the IRC checks for the receipt of any transmission packets in step 166. If no transmission packets are received, the operation of the IRC proceeds to step 167 where the IRC continues looking for the transmission packets by transferring operation back to step 166.

If a transmission packet is received in step 166, the operation of the IRC proceeds to step 169 where the IRC determines the routing destination for the packet of information. The routing destination for the packet of information is determined by header codes on the packet of information. These header codes are recognizable destinations or encoded destinations for the packet of information. Thus, all IRCs are capable of decoding the header information to determine the appropriate routing destination for the packet of information. Usually, the appropriate routing algorithm will include a most efficient path determination allowing for the shortest-most route to be used by the routing device for the packet of information to its destination.

After the routing destination is determined in step 169, the packet of information is shunted onto the appropriate fiber optic cable in step 170. After the information is shunted onto the appropriate fiber optic cable in step 170, the IRC determines whether this is the last packet of information in the transmission in step 173. The packets of information are transmitted in a stream of packets, and each packet or group of packets can comprise portions of the entire transmission.

With determination of the proper route for the initial transmission packet, the IRC has the capability of remembering the appropriate routing information for the subsequent related packets in the transmission stream. If the packet of information last routed onto the fiber optic cable is not the last packet of information in the transmission stream as determined in step 173, the IRC will look for related packets of information to route onto the same route in step 174. By using this process, the determination of the most efficient routing path or the appropriate fiber optic cable route need not be calculated upon the receipt of each packet of information, but the initial packet or packets of information will set the appropriate routing destination for the subsequent packets in the transmission stream.

In step 173, if the last packet of information in the transmission is received as determined by special codes in the tail codes, the program proceeds to step 172 where the routing device is reset. From step 172, the operation proceeds to step 166 to determine if any other transmission packets have been received. In step 174, the IRC is configured to look for related packets of information in order to route those related packets onto the same fiber optic cable, and the operation of the IRC is transferred to step 166 where the IRC looks for the receipt of any other transmission packets. If the routing device is already configured to look for those related transmission packets, no configurations are changed in the routing device. The routing of related packets of information onto the same routes by the IRC will continue unless there is a device failure recognized by the IRC during the transmission which would thereby necessitate the re-calculation of the most efficient route for the transmission packet. In such a case, the routing device would be reset to its initial condition and the most efficient route would be calculated using the information about the equipment defects in the system.

Operation of the Intelligent Line Module (ILM)

Figure 3B:
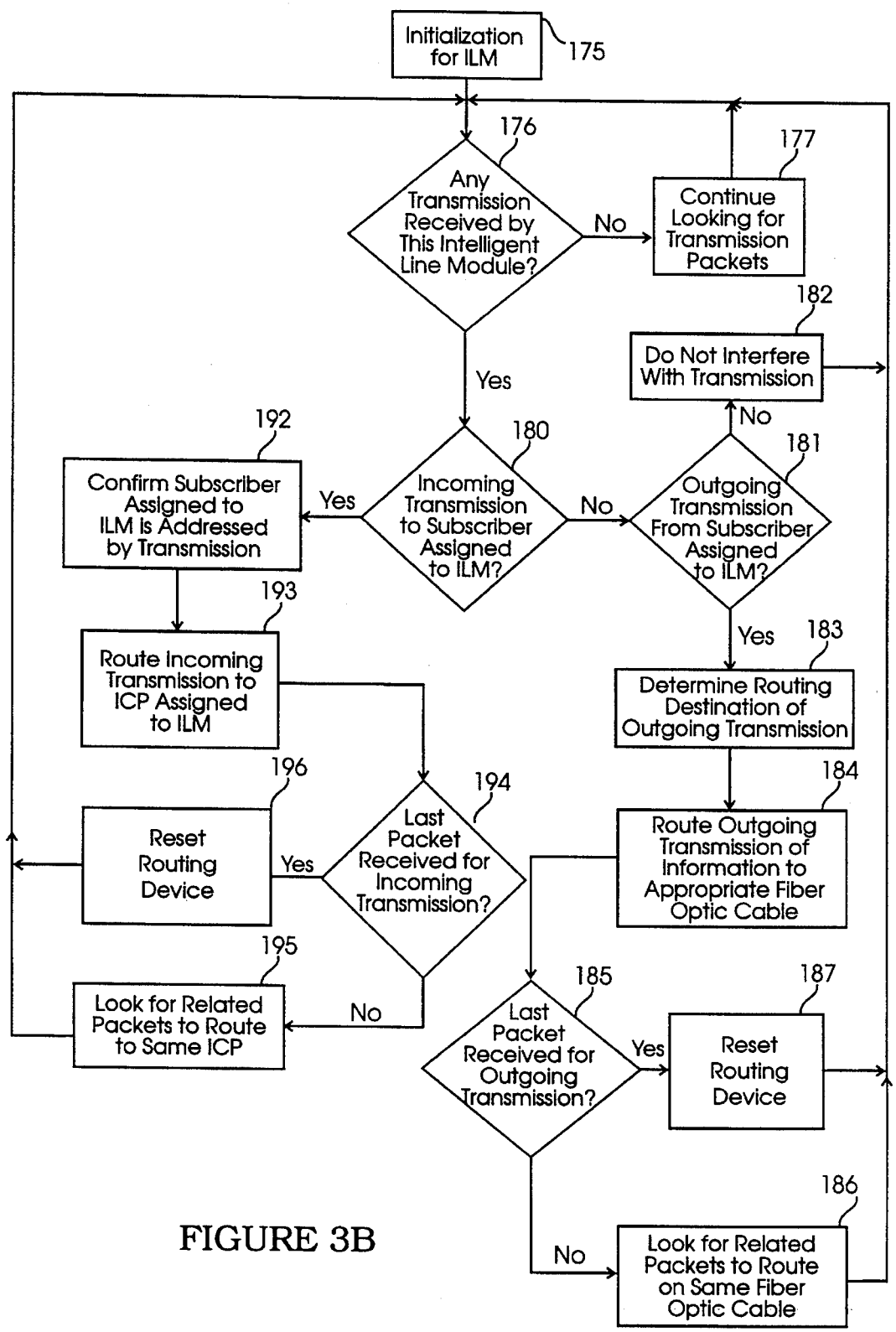
FIG. 3B is a flow chart for the operation of an Intelligent line module.

FIG. 3B discloses the operation of the intelligent line modules, such as ILM 25, 26, 27 or 28. In step 175, the ILM is initialized. Initialization of the ILM includes communication and recognition of all components coupled to the ILM on the fiber optic line segment where it is situated. This includes the recognition of the assigned ICPs and adjacent ILMs on the same fiber optic line, as well as recognition of the subscribers assigned to the particular ILM and ICP pair.

As shown in the layouts of the fiber optic matrix, each subscriber is assigned a particular ILM and ICP combination. Initialization also includes the identification of the IRCs placed on the same fiber optic line and their topological relationship to the ILM. These topological relationships are maintained by the ILM and are used to calculate the most efficient route for the shunting of the transmission packet through the fiber optic network. The identification of the assigned subscriber is maintained in the ILM so that it can determine when to shunt a transmission packet off of the fiber optic line to the proper ICP.

After step 175, the ILM looks for the receipt of any transmission along the fiber optic cable in step 176. If no transmission is received, the ILM operation proceeds to step 177 which allows the ILM to continue looking for transmission packets. After step 177 the operation proceeds back to step 176 to check for the receipt of any transmission packets. If a transmission packet is received in step 176, the operation of the ILM is transferred to step 180 where the ILM determines whether the transmission packet is an incoming transmission to the subscriber assigned to the ILM.

If the transmission packet is an incoming transmission to the subscriber assigned to the ILM, operation of the ILM transfers to step 192 where the ILM confirms that the subscriber assigned to the ILM is addressed by the transmission. The operation of the ILM proceeds from step 192 to step 193 where the incoming transmission is routed to the appropriate intelligent communication platform (shared ICP) assigned to the ILM. After step 192, the ILM determines whether this is the last transmission packet received for the transmission stream in step 194. If this is the last packet in the string of related transmission packets, the operation of the ILM is transferred to step 196 where the ILM is reset so that it will not look for related transmission packets. The operation of the ILM is then transferred back to step 176 where the ILM looks for the receipt of any other transmission packets.

If the last related transmission packet is not received in the incoming transmission stream in step 194, the operation of the ILM proceeds to step 195 where the ILM is set to look for related packets of information in the same transmission stream. If the routing device is already configured in such a manner, no configurations to the device are changed. As stated earlier, the ILM will be configured to remember routing information for related packets of information in a transmission stream. This will effectively eliminate the need to recalculate the appropriate routing destination with the receipt of each related transmission packet. After step 195, the ILM operation is transferred to step 176 where the ILM will look for the receipt of other transmission packets along the fiber optic line.

If the ILM determines that the transmission received in step 180 was not an incoming transmission to the subscriber assigned to the ILM, the operation of the ILM will transfer to step 181 where the ILM will determine if the transmission received by the ILM is an outgoing transmission from one of the subscribers assigned to the ILM. If the answer is no in step 181, the ILM should not interfere with the transmission because it is a transmission packet neither originating from nor destined for a subscriber assigned to the ILM. That is, if the transmission is not an incoming transmission to a subscriber assigned to the ILM as determined by step 180 and it is not an outgoing transmission from a subscriber assigned to the ILM as determined by step 181, the operation of the ILM is transferred to step 182 where the ILM is designated to not interfere with the transmission. The transmission packet is allowed to propagate along the fiber optic cable in step 182 without interference or shunting by the ILM. Thus, in step 182, the ILM will not shunt the transmission received on the fiber optic line or effect the transmission of the informational packet along the fiber optic line. After step 182, the operation of the ILM will transfer to step 176 where the ILM will look for the receipt of other information packets. The ILM can also be configured to ignore any packets with long distance destination codes (not in the local area of the ILM) as designated in the header information of the information packet.

If the outgoing transmission is determined to be from a subscriber assigned to the ILM in step 181, the operation of the ILM is transferred to step 183 where the destination of the outgoing transmission packet is determined. After the determination of the destination of the outgoing transmission packet in step 183, step 184 routes the transmission packet on the appropriate fiber optic cable to the next appropriate routing device. This next appropriate routing device may be another ILM on the fiber optic line or the appropriate IRC at the appropriate fiber optic line intersection.

After step 184, steps 185, 186 and 187 will set or re-set the routing device with regard to subsequent related transmission packets as described earlier. After steps 186 or 187, operation of the ILM is transferred back to step 176 for the search for other information packets by the ILM.

Operation of the Intelligent Communication
Platform (ICP)

Figure 3C:
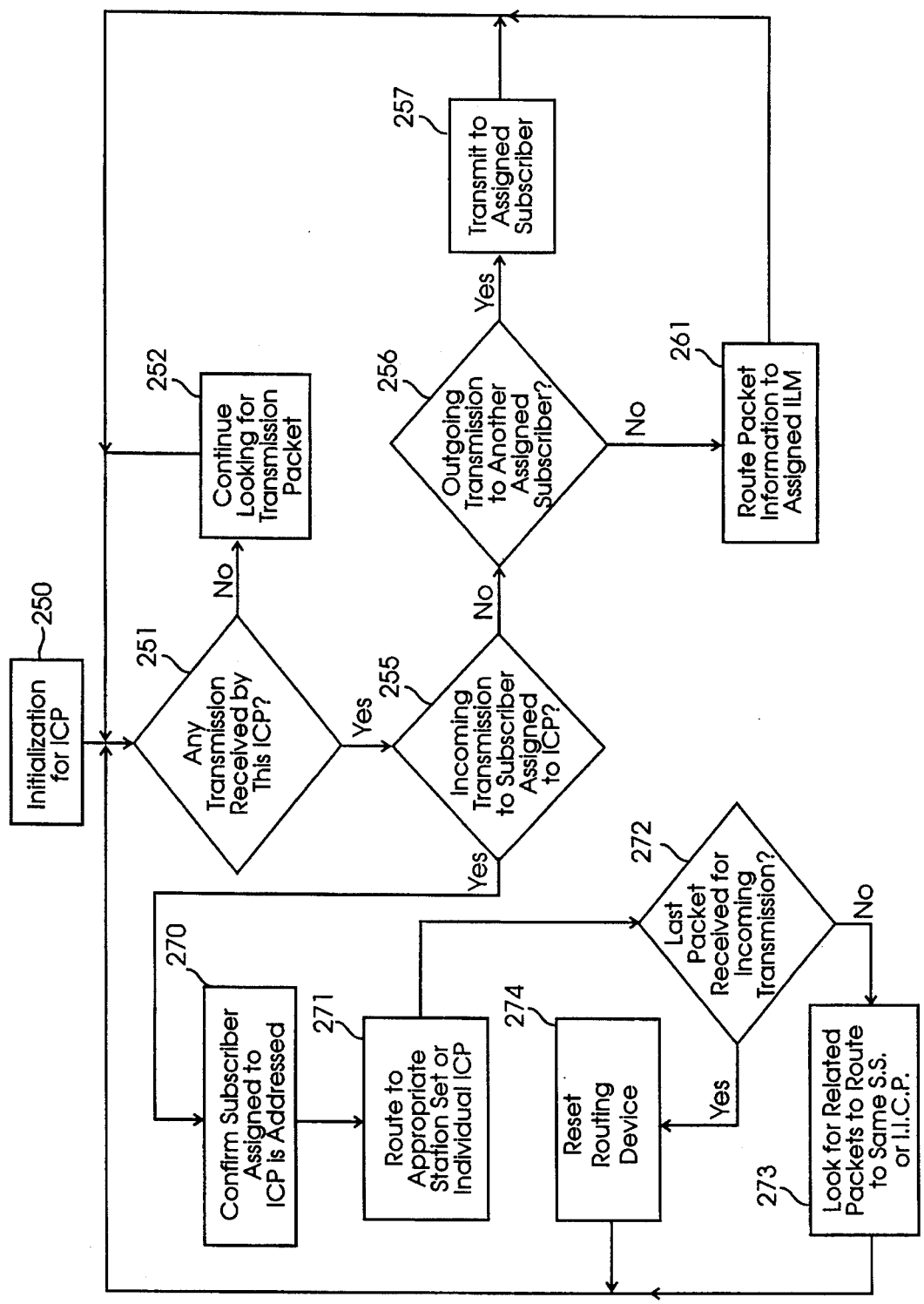
FIG. 3C is a flow chart for the operation of an intelligent communication platform.

In FIG. 3C, the operation of the intelligent communication platform (such as ICP 80 and 85) is shown. The ICP is initialized in step 250. Again, the initialization of the ICP includes the hand-shaking communication procedure used to determine the topological relationship of the ICP to the assigned ILM and subscribers. After initialization, the ICP operation proceeds to step 251 where the ICP determines whether any transmission has been received. If no transmission has been received by the ICP in step 251, the operation of the ICP transfers to step 252 where the ICP will continue looking for a transmission packet by transferring operation back to step 251.

If a transmission packet is received in step 251 by the ICP, the operation of the ICP is transferred to step 255 where the ICP determines whether the transmission is an incoming transmission packet to a subscriber assigned to the ICP. If the transmission packet received by the ICP is an incoming transmission to a subscriber assigned to the ICP, the operation of the ICP is transferred to step 270 where the ICP confirms that the information packet received by the ICP is to be routed to the subscriber assigned to the ICP. After step 270, the ICP will route the transmission packet to the subscriber assigned to the ICP in step 271.

After step 271, the ICP determines whether the transmission packet recently received is the last packet for an incoming transmission stream in step 272. If it is the last packet in the incoming transmission, the ICP operation proceeds to step 274 where the routing device is re-set, followed by the transfer of operation to step 251 where the ICP will look for other received transmissions. If the recently received incoming transmission packet is not the last related packet in the incoming transmission, the ICP will be set to look for related transmission packets to route to the same intelligent line cards associated with the assigned subscriber. After setting the ICP to look for the related packets of information in the same information transmission. In step 273, the operation of the ICP will transfer to step 251 where the ICP will look for any other received transmissions.

In step 255, if the transmission received by the ICP is not an incoming transmission destined for a subscriber assigned to the ICP, the ICP operation will proceed to step 256 where the ICP will determine whether the transmission received by the ICP is an outgoing transmission to be routed to another assigned subscriber of the ICP in step 256. If the transmission is to be routed to another assigned subscriber of the ICP, the ICP operation will transfer to step 257 where the transmission will be transmitted to the assigned subscriber coupled to the ICP. After step 257, the operation of the ICP will transfer back to step 251 where the ICP will again search for the receipt of transmission packets. If the transmission received by the ICP is not a transmission to another assigned subscriber on the ICP as determined in step 256, the operation of the ICP will transfer to step 261 where this information packet is routed to the assigned ILM. The operation of the ICP is then transferred back to step 251 where the ICP will again look for the receipt of transmission packets.

An Example Transmission in a Local Area

Looking at FIG. 2A, a typical transmission of information from subscriber 55 to subscriber 56 can be described as follows. As shown, subscriber 55 is in group 10 and subscriber 56 is in group 13. If subscriber 55 wishes to transmit information (e.g. make a telephone call) to subscriber 56, subscriber 55 will initiate the transmission and the line card 120 will be utilized to transfer information through line 122 to ICP 85. The line card 120 in this example will construct the appropriate transmission packets by appending the appropriate header information to the data to be transmitted. This line card 120 is a data processor capable of manipulating data appropriately to form the transmission packet.

ICP 85 determines that none of the other subscribers assigned to ICP 85 are being addressed by the transmission packet configured by line card 120. As such, ICP 85 transmits the packet along line 70 to ILM 30. ILM 30 determines that the proper route to transmit the information to subscriber 56 would be along fiber optic line 20 through ILM 29 and IRC 38. IRC 38 then determines that the appropriate route for the transmission packet should be fiber optic line 17 through ILM 31 to ILM 32. It is noted that ILMs 29 and 31 will determine that the transmission packets being transmitted on fiber optic lines 20 and 17, respectively, are destined for subscribers not assigned to these ILMs. As such, the ILMs will not interfere with the transmission of this information.

After the transmission packets are transmitted through ILM 31, the transmission packets will be received by ILM 32 on fiber optic line 17 for shunting to the ICP 86. The ILM 32 will shunt the transmission packet along line 74 to ICP 86 after it determines that the transmission packet has a destination of an assigned subscriber. ICP 86 will then determine whether the transmission is incoming or an outgoing transmission. Having determined that the transmission packet is incoming, the incoming transmission packet will be transmitted along line 123 to line card 121 for subscriber 56 for decoding. The ICPs 85 and 86, the ILMs 30 and 32, and the IRC 38 will configure their operation to look for related packets of information in the string of packets of information after decoding the header string on the initial packet of information received in the transmission packets.

In order for the subscriber 56 to transmit information to subscriber 55, the sequence of the transmission is reversed. That is, the ILM 32 routes information received from ICP 86 through line card 121, then to IRC 38 on fiber optic line 17. IRC 38 then shunts the transmission packets to ILM 30 on fiber optic line 20. ILM 30 shunts the information along line 70 to ICP 85 for transmission to the line card 120 along line 122 for subscriber 55.

If a defect arises on the transmission matrix along the first route determined to be the efficient route of the transmission packet, the defect will be recognized by the system and the routing devices will be notified to shunt information around the defect. For instance, if IRC 38 is damaged in FIG. 2A in the above example transmission, the ILM 30 will route information from ICP 85 along fiber optic line 20 to IRC 35. IRC 35 will then route the transmission packet to subscriber 56 along fiber optic lines 15 and 16 through IRC 36. The information transmission packet can then be transmitted to fiber optic line 17 through IRC 37 for shunting through ILM 32 to subscriber 56.

In this manner, a defective IRC 38 will not hinder the transmission of information between subscribers 55 and 56. Alternative routes through IRCs 35, 36 and 37 can effectively transmit the information without affecting the quality of the transmission. By utilizing these alternative routes as discusses above, the invention can provide numerous alternative routes for the transmission of information without regard to defects which may arise in the transmission matrix. Of course, as the defects increase along the transmission matrix, the number of alternative routes will be decreased. Ultimately, if the number of defects increases over a maximum threshold, the transmission of information to a particular group of subscribers may be cut off. However, through the use of these alternative routes and under the normal occurrence of defects in the information transmission matrix, the transmission of information should effectively and efficiently proceed even with defects arising on the transmission matrix.

The Interconnections with Other Networks

Figure 4:
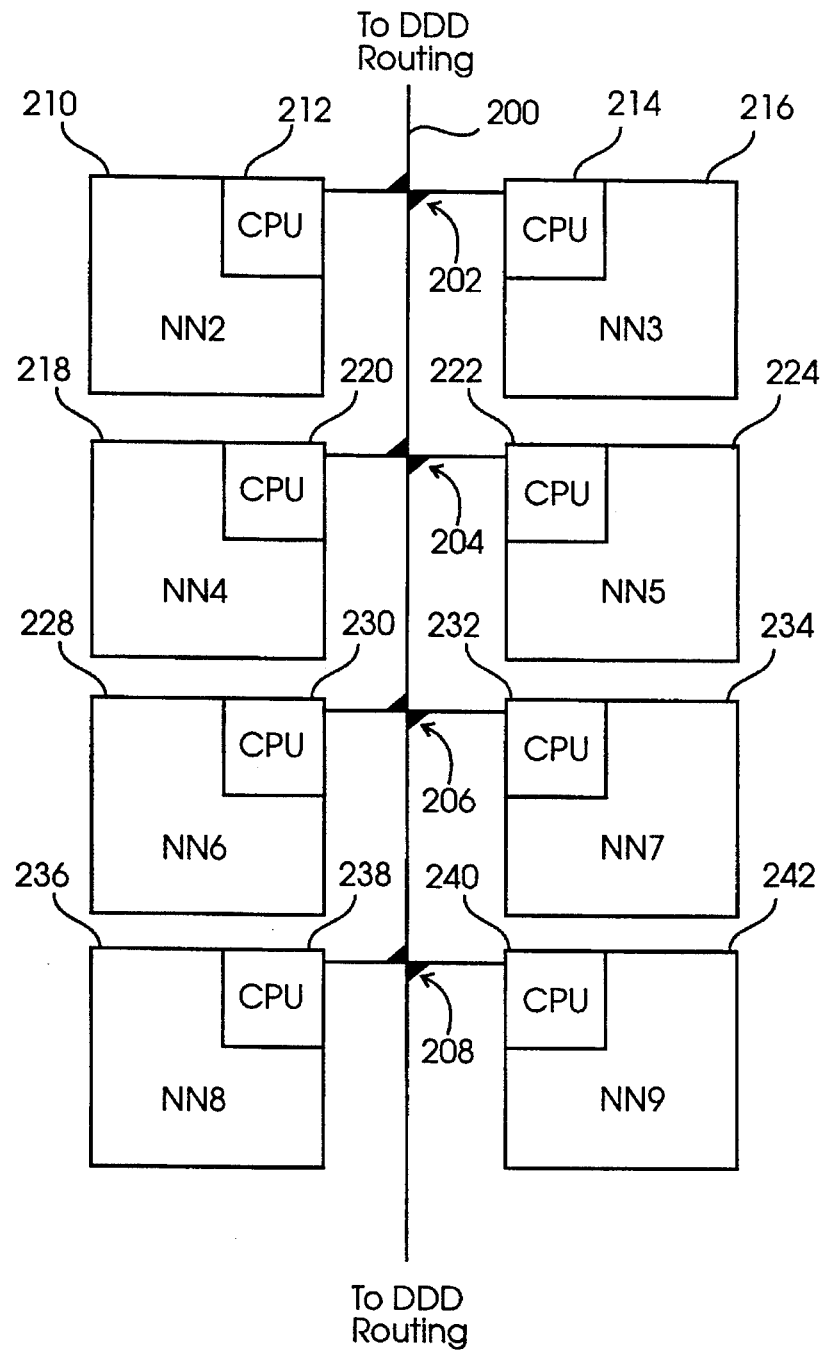
FIG. 4 is the NNX to NNX interlink connections on the fiber optic network.

The NNX to NNX inner-trunk connections are shown in FIG. 4. The NNX connections denoted calls outside the local area code, but not along the DDD (long distance) lines. The NNX to NNX connections are shown for a particular DDD area, and can also describe the configuration of all NNX codes in a DDD area. The individual subscribers are placed within each NNX location. Fiber optic cable 200 is coupled to intelligent routing cards 202, 204, 206 and 208, respectively. NN2 210 is coupled through CPU 212 to IRC 202. NN3 216 is coupled through CPU 214 to IRC 202. NN4 218 is coupled through CPU 220 to the IRC 204. NN5 224 is coupled through CPU 222 to IRC 204. NN6 228 is coupled through CPU 230 to IRC 206. NN7 234 is coupled through CPU 232 to IRC 206. NN8 236 is coupled through CPU 238 to IRC 208. NN9 242 is coupled through CPU 240 to IRC 208. The IRCs 202 and 208 are coupled to DDD routing as shown.

The CPUs shown here can perform similar functions to the CPUs 150 and 160 described earlier in FIG. 2B. Further, a second IRC may be coupled to each IRC 202, 204, 206 and 208 in order to handle emergency failures of the IRC or over-load situations.

Figure 5:
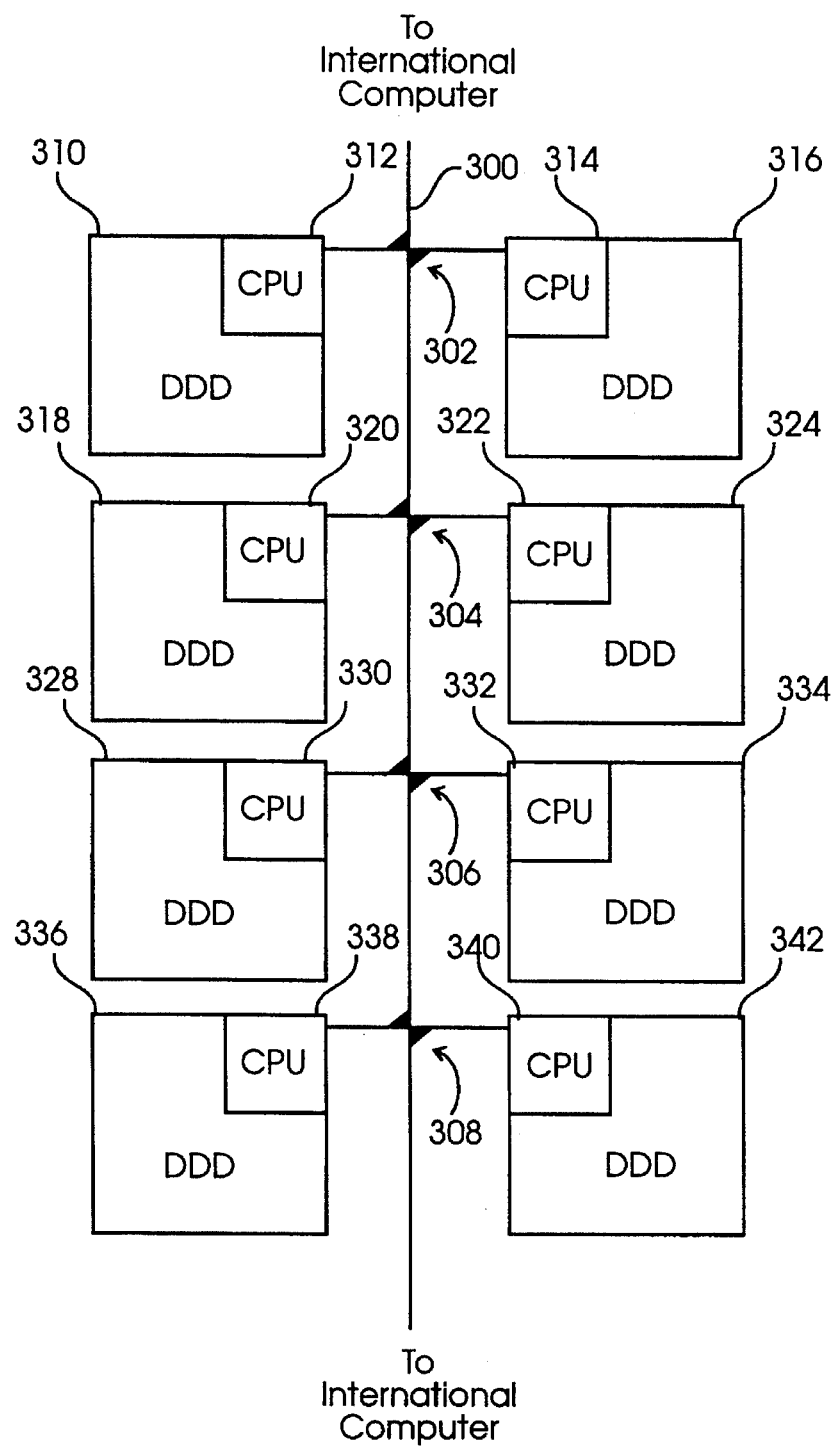
FIG. 5 is the DDD to DDD toll connection on the fiber optic network.

The DDD to DDD toll connections are shown in FIG. 5. The DDD exchange is a direct distance dialing (long distance) system. Fiber optic line 300 couples the DDD connections to the international computer for subsequent connection of data transmission to foreign countries and the international phone system. Fiber optic line 300 is coupled to intelligent routing cards 302, 304, 306 and 308. DDD 310 is coupled through CPU 312 to IRC 302. DDD 316 is coupled through CPU 314 to IRC 302. DDD 318 is coupled through CPU 320 to IRC 304. DDD 324 is coupled through CPU 322 to IRC 304. DDD 328 is coupled through CPU 330 to IRC 306. DDD 334 is coupled through CPU 332 to IRC 306. DDD 336 is coupled through CPU 338 to IRC 308. DDD 342 is coupled through CPU 340 to IRC 308. The CPUs described herein can perform in the same manner as discussed with respect to CPUs 150 and 160 in FIG. 2B. Further, a second IRC may be used with IRC 302, 304, 306 and 308 to handle emergency failures and overload situations.

Subscriber Emergency Back-Up system

Figure 6:
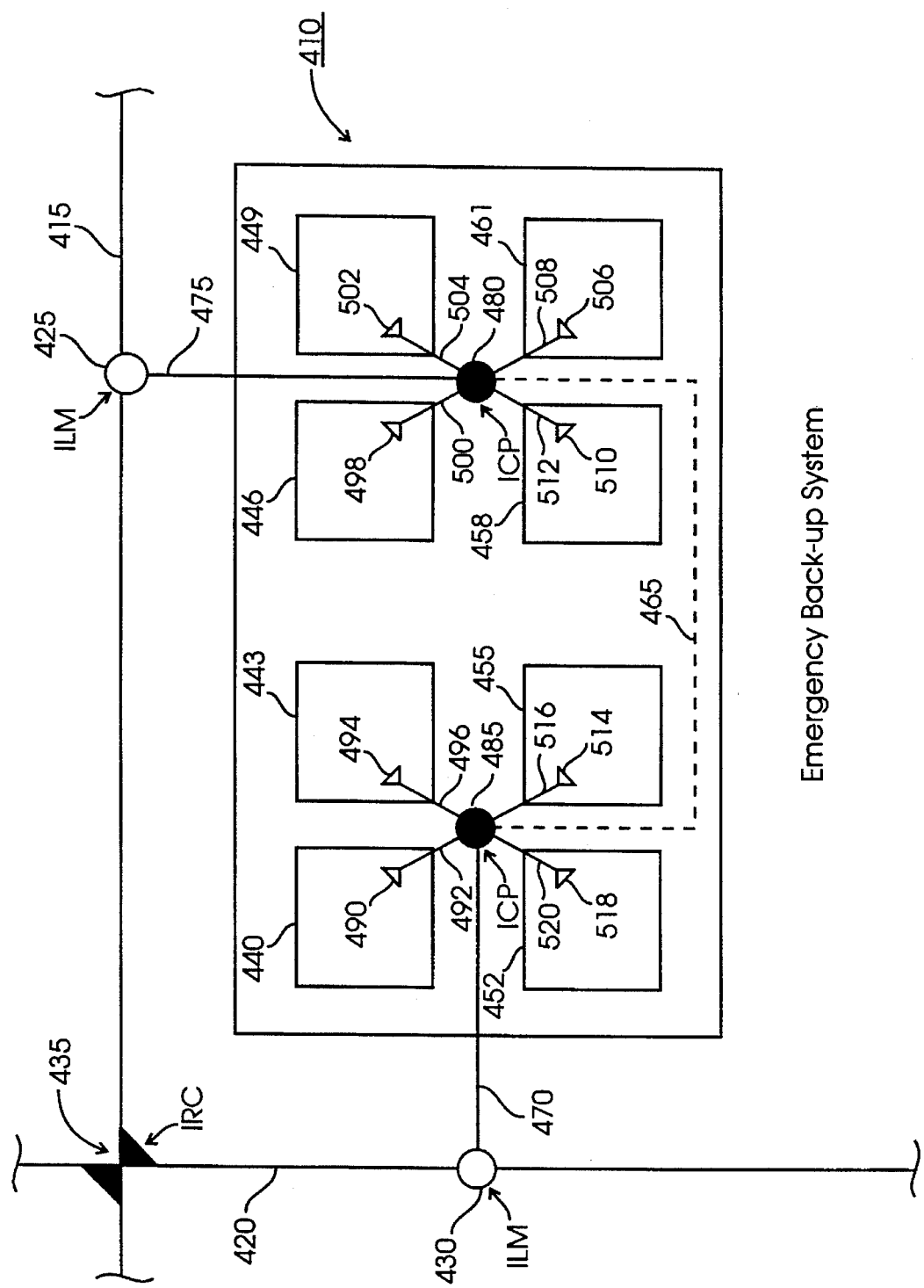
FIG. 6 is an example of an emergency back-up linkage between adjacent subscribers.

An emergency back-up feature of the invention is shown in FIG. 6. In the case where service to a group of subscribers is disconnected because of an equipment failure, an emergency back-up system is used. For instance, the emergency back-up system shown in FIG. 6 comprises a line connection 465 between ICPs 485 and 480. Thus, the subscribers shown in the group of eight subscribers 410 can utilize the connection to the fiber optic network of other subscribers in the group of eight, including their ICP and ILM connection, in order to divert calls away from the failed equipment. In order for this emergency back-up system to perform as desired, however, the IRC 435 must recognize the presence of a defect and the new location to shunt transmission packets to the new ILM and the ICP serving as the new transmission platform to the other ICP. Further, the new ICP must be alerted that a defect in the system has arisen and that the new ICP is accepting calls for the other ICP for future diversion of those calls.

In this example, subscriber 440 possesses line card 490 which is connected through line 492 to intelligent communication platform 485. Likewise, subscribers 443, 455 and 452 possess line cards 494, 514 and 518, respectively. Line cards 494, 514 and 518 are coupled to the ICP 485 through connectors 496, 516 and 520, respectively. Further, subscribers 446, 449, 461 and 458 possess line cards 498, 502, 506 and 510, respectively. Line cards 498, 502, 506 and 510 are coupled to ICP 480 through line 500, 504, 508 and 512, respectively.

Emergency back-up system line 465 is coupled to both ICPs 485 and 480. ICP 485 is coupled to fiber optic line 420 through line 470 and ILM 430. ICP 480 is coupled to fiber optic line 415 through line 475 and ILM 425. Fiber optic lines 420 and 415 are coupled to the IRC 435 at their intersection point.

As an example, if a failure of fiber optic line 415 occurs, service would be disrupted to subscribers 446, 449, 461 and 458 if there was no emergency back-up system was available. If there is a failure in the system as described with respect to fiber optic line 415, service may be rerouted at intelligent routing card 435 through fiber optic line 420 to intelligent line module 430. From intelligent line module 430, transmission packets being sent to subscribers 446, 449, 458 and 461 may be transmitted through connector 470 to ICP 485. These diverted signals may be transmitted through the ICP 485 along the emergency back-up system line 465 to the ICP 480. Once these diverted signals have reached ICP 480, the signal may be transmitted to the intended subscribers 446, 449, 461 or 458. In this manner, a particular failure in the transmission matrix may be corrected by the emergency back-up system. Further, other types of failures may be fixed including the diversion of signals around failed equipment. This emergency backup system, as well as the other back-up systems in the network provide for a higher level of redundancy in the system and should minimize disconnections of service to subscribers.

Subscriber Configurations

Figure 7:
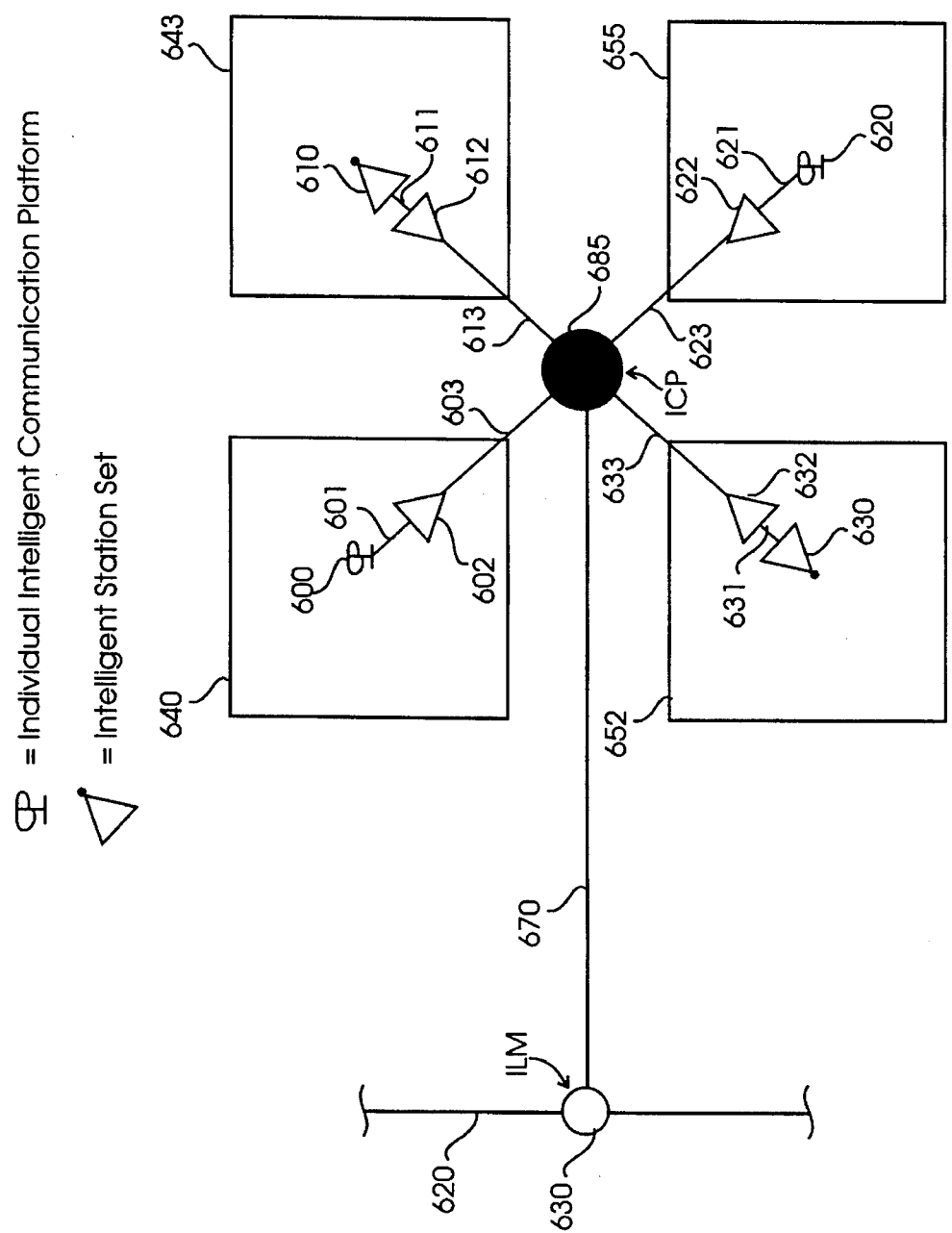
FIG. 7 is an example of different subscriber configuration.

A subscriber may use different components coupled to the line card, such as intelligent station sets or individual intelligent communication platforms as shown in FIG. 7. The individual intelligent communication platform may be configured as specifically described in application Ser. No. 08/476,343, entitled An Improved and Enhanced Individual Intelligent Communication Platform for Subscribers on a Telephone System, filed Jun. 7, 1995, which is co-pending with this application, the teachings of which are expressly incorporated herein. The individual intelligent communication platform can be distinguished from the shared intelligent communication platform described in this application (e.g. 80, 85). Intelligent station sets may include the known design for a station set connected to a telephone line or may be enhanced versions thereof. In FIG. 7, subscriber 640 and 655 are shown with individual intelligent communication platforms 600 and 620 coupled to line card 602 and 622, respectively. Further, subscribers 643 and 652 possess intelligent station sets 610 and 630, respectively, which are coupled to line cards 612 and 632, respectively. Fiber optic line 620, intelligent line module 630, connector set 670 and intelligent communication platform 685 are the same components as shown in FIG. 1A.

Conference Calling and Call Broadcasting

Conference calling and third party calls may be supported by the network by placing multiple destination codes in the header information. When a routing device determines it is necessary to send packet transmissions to multiple destinations, the packet transmission is duplicated and sent to those multiple subscribers. As such, an individual transmission packet may be shunted and duplicated to numerous different destinations on the fiber optic matrix.

Numerous simultaneous subscribers may be supported on a single transmission of information. In essence, the transmission could be viewed as a broadcast to multiple destinations. This is not the manner of shunting calls described earlier, but can be used to support communication between more than two parties at the same time. By modifying the transmission protocol slightly, however, the network can support conference calling and data broadcasting features.

The above description provides the preferred embodiment for the transmission system. Improvements and modifications may be made without departing from the invention described and claimed herein.

It is claimed:

1. A fiber optic transmission system comprising:
    a plurality of fiber optic lines, subscriber locations, intelligent communication platforms, and at least one intelligent routing card;
    a first source of data at a first subscriber location;
    a first data processor line card at said first subscriber location capable of forming a plurality of data transmission packets with data, header and tail information;
    a first intelligent communication platform coupled to said first data processor line card by fiber optic lines wherein said first intelligent communication platform is capable of receiving any one of said transmission packets, determining the appropriate route for said one transmission packet and is capable of shunting said one transmission packet onto the appropriate fiber optic line to a first intelligent line module;
    a first intelligent routing card at the junction of at least two fiber optic lines and coupled to said first intelligent line module wherein said first intelligent routing card is capable of receiving any one of said transmission packets, determining the appropriate route for said one transmission packet and shunting said one transmission packet onto the appropriate fiber optic line to or away from said first intelligent line module; and a second data processor line card at a second subscriber location coupled to said first intelligent routing card capable of receiving said transmission packet and decoding the data within said packet.

2. The fiber optic transmission system of claim 1 further comprising:

a second intelligent line module coupled to said first intelligent routing card wherein said second intelligent line module is capable of receiving any one of said transmission packets, determining the appropriate route for said one transmission packet and shunting said one transmission packet onto the appropriate fiber optic line to or away from said first intelligent routing card.

3. The fiber optic transmission system of claim 1 further comprising:

a second intelligent communication platform coupled to said second intelligent line module coupled to said second data processor line card wherein said second intelligent communication platform is capable of receiving any one of said transmission packets, determining the appropriate route for said one transmission packet and shunting said one transmission packet onto the appropriate fiber optic line to or away from said second intelligent data processor line card.

4. The fiber optic transmission system of claim 3 further comprising:

a second intelligent line module coupled to said first intelligent routing card wherein said second intelligent line module is capable of receiving any one of said transmission packets, determining the appropriate route for said one transmission packet and shunting said one transmission packet onto the appropriate fiber optic line to or away from said first intelligent routing card.

5. The fiber optic transmission system of claim 3 further comprising:

wherein the intelligent communication platform possesses a memory function allowing the intelligent communication platform to recognize related transmission packets for the same transmission from the same location and directed to the same destination for routing in a similar manner as the initial transmission packet in the transmission stream.

6. The fiber optic transmission system of claim 3 further comprising:

wherein the intelligent line module possesses a memory function allowing the intelligent line module to recognize related transmission packets for the same transmission from the same location and directed to the same destination for routing in a similar manner as the initial transmission packet in the transmission stream.

7. The fiber optic transmission system of claim 3 further comprising:

wherein the intelligent routing card possesses a memory function allowing the intelligent routing card to recognize related transmission packets for the same transmission from the same location and directed to the same destination for routing in a similar manner as the initial transmission packet in the transmission stream.

8. The fiber optic transmission system of claim 3 further comprising:

a first central processing unit coupled to said intelligent routing card for routing transmission packets to a second central processing unit to support long distance and international communications.

9. The fiber optic transmission system of claim 3 further comprising:

wherein each intelligent communication platform, intelligent line module, and intelligent routing card performs an initialization to determine their location in the network with respect to adjacent routing devices.

10. A fiber optic transmission system comprising:

a plurality of fiber optic lines, subscriber locations, intelligent communication platforms, and at least one intelligent routing card;

a first source of data at a first subscriber location;

a first data processor line card at said first subscriber location capable of forming a plurality of transmission packets each with data, header and tail information;

a first intelligent communication platform coupled to said first data processor line card by fiber optic lines wherein said first intelligent communication platform is capable of receiving any one of said transmission packets, determining the appropriate route for said one transmission packet and shunting said one transmission packet onto the appropriate fiber optic line;

a first intelligent line module coupled to said intelligent communication platform by fiber optic lines wherein said first intelligent line module is capable of receiving any one of said transmission packets, determining the appropriate route for said one transmission packet and is capable of shunting said one transmission packet onto the appropriate fiber optic line to or away from said first intelligent communication platform;

a first intelligent routing card at the junction of at least two fiber optic lines and coupled to said first intelligent line module wherein said first intelligent routing card is capable of receiving any one of said transmission packets, determining the appropriate route for said one transmission packet and shunting said one transmission packet onto the appropriate fiber optic line to or away from said first intelligent line module;

a second intelligent line module coupled to said first intelligent routing card wherein said second intelligent line module is capable of receiving any one of said transmission packets, determining the appropriate route for said one transmission packet and shunting said one transmission packet onto the appropriate fiber optic line to or away from said first intelligent routing card;

a second intelligent communication platform coupled to said second intelligent line module coupled to said second intelligent line module wherein said second intelligent communication platform is capable of receiving any one of said transmission packets, determining the appropriate route for said one transmission packet and shunting said one transmission packet onto the appropriate fiber optic line to or away from said second intelligent line module; and a second data processor line card at a second subscriber location coupled to said second intelligent communication platform wherein said second data processor line card is capable of receiving said one transmission packet and decoding the data within said transmission packet.

11. The fiber optic transmission system of claim 10 further comprising:

wherein the intelligent communication platform possesses a memory function allowing the intelligent communication platform to recognize related transmission packets for the same transmission from the same location and directed to the same destination for routing in a similar manner as the initial transmission packet in the transmission stream.

12. The fiber optic transmission system of claim 10 further comprising:

wherein the intelligent line module possesses a memory function allowing the intelligent line module to recognize related transmission packets for the same transmission from the same location and directed to the same destination for routing in a similar manner as the initial transmission packet in the transmission stream.

13. The fiber optic transmission system of claim 10 further comprising:

wherein the intelligent routing card possesses a memory function allowing the intelligent routing card to recognize related transmission packets for the same transmission from the same location and directed to the same destination for routing in a similar manner as the initial transmission packet in the transmission stream.

14. The fiber optic transmission system of claim 10 further comprising:

a first central processing unit coupled to said intelligent routing card for routing transmission packets to a second central processing unit to support long distance and international communications.

15. The fiber optic transmission system of claim 10 further comprising:

wherein each intelligent communication platform, intelligent line module, and intelligent routing card performs an initialization to determine their location in the network with respect to adjacent routing devices.

16. The method of routing calls on a fiber optic network having a plurality of fiber optic lines, subscriber locations, intelligent communication platforms, and at least one intelligent routing card, comprising the steps of:

initializing a first and second intelligent line card data processor, a first and second intelligent communication platform, a first and second intelligent line module, and an intelligent routing card;

forming a transmission packet at a first subscriber location with the first intelligent line card dam processor wherein said transmission packet possesses header information, data information and tail information;

transmitting the transmission packet from the first intelligent line card data processor to said first intelligent communication platform where the destination of the transmission packet is determined and the routing determination is made;

routing the transmission packet from the first intelligent communication platform to an intelligent line module where the destination of the transmission packet is determined and the routing determination is made;

routing the transmission packet from the first intelligent line module to said intelligent routing card where the destination of the transmission packet is determined and the routing determination is made;

routing the transmission packet from the intelligent routing card to the second intelligent line module where the destination of the transmission packet is determined and the routing determination is made;

routing the transmission packet from the second intelligent line module to the second intelligent communication platform where the destination of the transmission packet is determined and the routing determination is made;

routing the transmission packet from the second intelligent communication platform to the second intelligent line card which is the destination of the transmission so that the transmission packet can be decoded.

17. The method of routing calls on a fiber optic network as set forth in claim 16, comprising the further steps of:

routing the transmission packet based upon prior destination determinations from related transmission packets.

18. The method of routing calls on a fiber optic network as set forth in claim 16, comprising the further steps of:

determining a second route for the transmission packet based upon a failure in the initial route determined to be appropriate for the transmission packet.

19. The method of routing calls on a fiber optic network as set forth in claim 16, comprising the further steps of:

routing the transmission packet to a central processing unit for routing of the transmission packet onto a long distance or international network.

20. The method of routing calls on a fiber optic network as set forth in claim 19, comprising the further steps of:

determining a second route for the transmission packet based upon a failure in the initial route determined to be appropriate for the transmission packet.

* * * * *

(12) EX PARTE REEXAMINATION CERTIFICATE (5785th)
United States Patent
Zelikovitz et al.

(10) Number: US 5,555,478 C1
(45) Certificate Issued: Jun. 19, 2007

(54) FIBER OPTIC INFORMATION TRANSMISSION SYSTEM

(75) Inventors: Joseph Zelikovitz, deceased, late of Grove, OK (US); by Bernard Greenblott, executor, Deerfield Beach, FL (US); by Jerry L. Owen, executor, Del City, OK (US)

(73) Assignee: Red River Fiber Optics Corporation, Dallas, TX (US)

Reexamination Request:
No. 90/006,402, Oct. 4, 2002

Reexamination Certificate for:
Patent No.: 5,555,478
Issued: Sep. 10, 1996
Appl. No.: 08/471,827
Filed: Jun. 7, 1995

(51) Int. Cl.
*H04J 14/00* (2006.01)
*H04B 10/00* (2006.01)
*H04Q 3/52* (2006.01)

(52) U.S. Cl. .................. 398/66; 340/2.1; 370/218; 398/2; 398/54

(58) Field of Classification Search .................. 398/45, 398/51, 54; 370/218, 389
See application file for complete search history.

(56) References Cited

U.S. PATENT DOCUMENTS

| 3,101,472 A | 8/1963 | Goubau |
| 3,107,301 A | 10/1963 | Willard |
| 3,166,623 A | 1/1965 | Waidelich, Jr. |
| 3,208,342 A | 9/1965 | Nethercot, Jr. |
| 3,229,104 A | 1/1966 | Rutz |
| 3,234,559 A | 2/1966 | Bartholomä et al. |
| 3,235,672 A | 2/1966 | Beguia |
| 3,240,106 A | 3/1966 | Hicks, Jr. |
| 3,244,075 A | 4/1966 | Richards et al. |
| 3,257,902 A | 6/1966 | Horace et al. |
| 3,267,209 A | 8/1966 | Nagomori et al. |
| 3,267,555 A | 8/1966 | Berger et al. |
| 3,269,387 A | 8/1966 | Wallace |
| 3,284,722 A | 11/1966 | Gray |
| 3,304,433 A | 2/1967 | Hamann |
| 3,305,689 A | 2/1967 | Leavy, Jr. et al. |
| 3,311,747 A | 3/1967 | Smith, Jr. et al. |
| 3,312,827 A | 4/1967 | McNaney |
| 3,315,160 A | 4/1967 | Goodman |
| 3,316,800 A | 5/1967 | Kibler |
| 3,330,190 A | 7/1967 | Taillie |
| 3,331,956 A | 7/1967 | Hough et al. |
| 3,335,367 A | 8/1967 | Skooglund et al. |
| 3,354,405 A | 11/1967 | Bebb et al. |
| 3,364,432 A | 1/1968 | Boyd |
| 3,365,568 A | 1/1968 | Germen |
| 3,372,628 A | 3/1968 | Starp |
| 3,382,343 A | 5/1968 | Muncheryan |
| 3,385,970 A | 5/1968 | Coffin, Jr. et al. |
| 3,387,909 A | 6/1968 | Anderson et al. |
| 3,389,950 A | 6/1968 | Harper |
| 3,398,286 A | 8/1968 | Ford et al. |

(Continued)

FOREIGN PATENT DOCUMENTS

| BD | DT2538638 | 3/1977 |
| DE | 3109521 A1 | 9/1982 |
| DE | 84 00806 | 1/1984 |
| EP | 0167237 A1 | 8/1986 |
| GB | 2167276 | 5/1986 |
| WO | 94/06236 | 3/1994 |

OTHER PUBLICATIONS

D. Getchell et al., "Fiber Channel in the Local Area Network", IEEE LTS, May 1992.*

(Continued)

*Primary Examiner*—Shi K. Li

(57) ABSTRACT

A unique fiber optic network with shunting routing devices strategically placed on the fiber optic matrix. These shunting devices divert the packeted information through the network to the intended subscriber. Emergency back-up and alternative routes are provided for in the system.

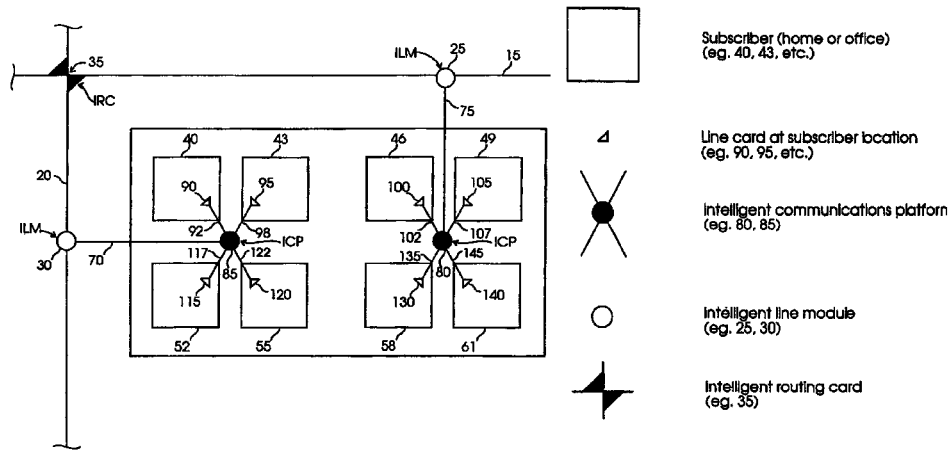

U.S. PATENT DOCUMENTS

| | | |
|---|---|---|
| 3,398,288 A | 8/1968 | Sanders et al. |
| 3,416,089 A | 12/1968 | Koester et al. |
| 3,420,596 A | 1/1969 | Osterberg |
| 3,423,594 A | 1/1969 | Galopin |
| 3,449,036 A | 6/1969 | Jacobsen |
| 3,449,037 A | 6/1969 | Koester |
| 3,453,035 A | 7/1969 | Walther |
| 3,455,625 A | 7/1969 | Brumley et al. |
| 3,455,667 A | 7/1969 | Snitzer et al. |
| 3,455,668 A | 7/1969 | Upton |
| 3,457,000 A | 7/1969 | Genähr et al. |
| 3,461,539 A | 8/1969 | Napple |
| 3,469,026 A | 9/1969 | Winik et al. |
| 3,470,320 A | 9/1969 | Pike et al. |
| 3,475,609 A | 10/1969 | Schneider |
| 3,481,660 A | 12/1969 | Sheldon |
| 3,483,389 A | 12/1969 | Cronin |
| 3,484,710 A | 12/1969 | Koester |
| 3,489,481 A | 1/1970 | Osterberg et al. |
| 3,492,058 A | 1/1970 | Waldman |
| 3,492,485 A | 1/1970 | Marcatili |
| 3,504,984 A | 4/1970 | Bush |
| 3,506,331 A | 4/1970 | Kompfner |
| 3,507,378 A | 4/1970 | Stuckert |
| 3,508,307 A | 4/1970 | Mayer |
| 3,509,353 A | 4/1970 | Sundblad et al. |
| 3,510,641 A | 5/1970 | Reynolds |
| 3,510,667 A | 5/1970 | Cleveland et al. |
| 3,517,981 A | 6/1970 | Rueger et al. |
| 3,519,116 A | 7/1970 | Koehn |
| 3,529,205 A | 9/1970 | Miller |
| 3,533,677 A | 10/1970 | Osterberg et al. |
| 3,534,729 A | 10/1970 | Sakamoto |
| 3,538,321 A | 11/1970 | Longenecker et al. |
| 3,538,919 A | 11/1970 | Meyer |
| 3,539,796 A | 11/1970 | Zychal |
| 3,541,341 A | 11/1970 | Leete |
| 3,547,526 A | 12/1970 | Devereux |
| 3,556,634 A | 1/1971 | Townes et al. |
| 3,564,231 A | 2/1971 | Bruce et al. |
| 3,569,933 A | 3/1971 | Longenecker et al. |
| 3,572,891 A | 3/1971 | Camcois |
| 3,576,563 A | 4/1971 | Scott et al. |
| 3,579,316 A | 5/1971 | Dyott et al. |
| 3,582,637 A | 6/1971 | Cecil, Jr. |
| 3,584,230 A | 6/1971 | Tien |
| 3,584,779 A | 6/1971 | Kessler et al. |
| 3,589,056 A | 6/1971 | Glass et al. |
| 3,589,795 A | 6/1971 | Miyazaki |
| 3,590,246 A | 6/1971 | Menke |
| 3,596,104 A | 7/1971 | Macomber |
| 3,599,630 A | 8/1971 | Sato et al. |
| 3,600,058 A | 8/1971 | Kato |
| 3,600,594 A | 8/1971 | Moore |
| 3,606,522 A | 9/1971 | Townes et al. |
| 3,610,727 A | 10/1971 | Ulrich |
| 3,610,755 A | 10/1971 | Wieberger et al. |
| 3,611,354 A | 10/1971 | Gordon et al. |
| 3,612,687 A | 10/1971 | Cook et al. |
| 3,614,198 A | 10/1971 | Martin et al. |
| 3,614,209 A | 10/1971 | Seaman |
| 3,617,108 A | 11/1971 | Fritsch et al. |
| 3,617,109 A | 11/1971 | Tien |
| 3,619,030 A | 11/1971 | Tomll et al. |
| 3,620,603 A | 11/1971 | White et al. |
| 3,624,385 A | 11/1971 | Wall |
| 3,624,406 A | 11/1971 | Martin et al. |
| 3,628,036 A | 12/1971 | Humphrey |
| 3,628,861 A | 12/1971 | Goubau |
| 3,637,284 A | 1/1972 | Plyler |
| 3,638,008 A | 1/1972 | Keller et al. |
| 3,649,098 A | 3/1972 | Suverison |
| 3,650,187 A | 3/1972 | Judin |
| 3,653,739 A | 4/1972 | Strack |
| 3,655,275 A | 4/1972 | Seagreaves |
| 3,656,832 A | 4/1972 | Judin |
| 3,663,822 A | 5/1972 | Uchida |
| 3,666,347 A | 5/1972 | Kitano et al. |
| 3,666,348 A | 5/1972 | Marcatili |
| 3,674,335 A | 7/1972 | Ashkin et al. |
| 3,674,336 A | 7/1972 | Kogelnik |
| 3,674,337 A | 7/1972 | Marcatili |
| 3,674,914 A | 7/1972 | Burr |
| 3,683,167 A | 8/1972 | Rishton |
| 3,687,514 A | 8/1972 | Miller et al. |
| 3,689,264 A | 9/1972 | Chandross et al. |
| 3,697,888 A | 10/1972 | Danielmeyer |
| 3,700,303 A | 10/1972 | Smith et al. |
| 3,700,900 A | 10/1972 | Herleikson |
| 3,704,996 A | 12/1972 | Borner et al. |
| 3,705,756 A | 12/1972 | Keller et al. |
| 3,705,992 A | 12/1972 | Ippen et al. |
| 3,710,091 A | 1/1973 | Holcomb |
| 3,710,798 A | 1/1973 | Bredemeier |
| 3,713,338 A | 1/1973 | Kind |
| 3,717,769 A | 2/1973 | Hubbard et al. |
| 3,718,074 A | 2/1973 | Davis |
| 3,719,411 A | 3/1973 | Midwinter |
| 3,719,906 A | 3/1973 | Tournois |
| 3,721,815 A | 3/1973 | Wall |
| 3,723,722 A | 3/1973 | Van Iderstine et al. |
| 3,723,921 A | 3/1973 | Rowe et al. |
| 3,725,809 A | 4/1973 | Ulrich et al. |
| 3,734,594 A | 5/1973 | Trambarulo |
| 3,751,655 A | 8/1973 | Codrino |
| 3,753,157 A | 8/1973 | Ash et al. |
| 3,756,688 A | 9/1973 | Hudson et al. |
| 3,758,189 A | 9/1973 | Codrino |
| 3,760,297 A | 9/1973 | Thompson |
| 3,764,195 A | 10/1973 | Blank et al. |
| 3,768,146 A | 10/1973 | Braun et al. |
| 3,769,590 A | 10/1973 | Hendrickson |
| 3,770,342 A | 11/1973 | Dudragne |
| 3,770,909 A | 11/1973 | Rose et al. |
| 3,770,910 A | 11/1973 | Rose et al. |
| 3,772,611 A | 11/1973 | Smith |
| 3,773,289 A | 11/1973 | Gloge |
| 3,774,987 A | 11/1973 | Boivin |
| 3,776,176 A | 12/1973 | Doyle |
| 3,776,614 A | 12/1973 | Kloots et al. |
| 3,777,149 A | 12/1973 | Marcatili |
| 3,779,628 A | 12/1973 | Kapron et al. |
| 3,780,295 A | 12/1973 | Kapron et al. |
| 3,780,722 A | 12/1973 | Swet |
| 3,781,546 A | 12/1973 | Christian et al. |
| 3,781,555 A | 12/1973 | Keefe |
| 3,783,065 A | 1/1974 | Rumson |
| 3,786,266 A | 1/1974 | Reid et al. |
| 3,786,424 A | 1/1974 | McVoy et al. |
| 3,787,837 A | 1/1974 | Allen et al. |
| 3,791,715 A | 2/1974 | Lean et al. |
| 3,792,284 A | 2/1974 | Kaelin |
| 3,795,434 A | 3/1974 | Ash |
| 3,797,911 A | 3/1974 | Kogelnik et al. |
| 3,798,099 A | 3/1974 | Marcatili |
| 3,800,388 A | 4/1974 | Börner et al. |
| 3,802,761 A | 4/1974 | Giallorenzi et al. |
| 3,803,409 A | 4/1974 | Prochazka |
| 3,803,491 A | 4/1974 | Osborn |
| 3,803,511 A | 4/1974 | Thompson |
| 3,804,487 A | 4/1974 | Mahlein |

| | | | | | | |
|---|---|---|---|---|---|---|
| 3,805,048 A | 4/1974 | Brennesholtz | | 3,900,245 A | 8/1975 | Dyott et al. |
| 3,805,066 A | 4/1974 | Chijuma et al. | | 3,901,581 A | 8/1975 | Thiel |
| 3,806,225 A | 4/1974 | Codrino | | 3,901,582 A | 8/1975 | Milton |
| 3,806,226 A | 4/1974 | Tien | | 3,902,784 A | 9/1975 | Dakss et al. |
| 3,809,455 A | 5/1974 | Pekau et al. | | 3,902,785 A | 9/1975 | Matthews |
| 3,810,802 A | 5/1974 | Buhite et al. | | 3,902,786 A | 9/1975 | Brown |
| 3,813,142 A | 5/1974 | Buhrer | | 3,903,615 A | 9/1975 | Dotsko |
| 3,813,514 A | 5/1974 | Canty | | 3,904,269 A | 9/1975 | Lebduska et al. |
| 3,814,498 A | 6/1974 | Tomlinson, III et al. | | 3,904,270 A | 9/1975 | Cheo |
| 3,819,249 A | 6/1974 | Borner et al. | | 3,905,676 A | 9/1975 | Ulrich |
| 3,820,871 A | 6/1974 | Croset et al. | | 3,906,393 A | 9/1975 | Fletcher et al. |
| 3,821,732 A | 6/1974 | Romney | | 3,908,121 A | 9/1975 | Riseberg et al. |
| 3,825,318 A | 7/1974 | Croset et al. | | 3,909,110 A | 9/1975 | Marcuse |
| 3,825,319 A | 7/1974 | Cook et al. | | 3,910,677 A | 10/1975 | Becker et al. |
| 3,825,320 A | 7/1974 | Redfern | | 3,910,678 A | 10/1975 | McCartney et al. |
| 3,825,335 A | 7/1974 | Reynolds | | 3,912,362 A | 10/1975 | Hudson |
| 3,825,336 A | 7/1974 | Reynolds | | 3,912,363 A | 10/1975 | Hammer |
| 3,828,264 A | 8/1974 | Friedl et al. | | 3,912,364 A | 10/1975 | Hudson |
| 3,829,195 A | 8/1974 | Rawson | | 3,912,478 A | 10/1975 | Presby |
| 3,831,017 A | 8/1974 | Auer | | 3,912,574 A | 10/1975 | Cherin et al. |
| 3,832,030 A | 8/1974 | Gloge | | 3,914,013 A | 10/1975 | Rosenberg |
| 3,833,284 A | 9/1974 | Kaminow et al. | | 3,914,015 A | 10/1975 | McCartney |
| 3,834,391 A | 9/1974 | Block | | 3,914,880 A | 10/1975 | Dakss et al. |
| 3,837,827 A | 9/1974 | Carruthers et al. | | 3,917,383 A | 11/1975 | Cook et al. |
| 3,839,067 A | 10/1974 | Sosnowski et al. | | 3,917,384 A | 11/1975 | Harper et al. |
| 3,844,171 A | 10/1974 | Rodger | | 3,918,794 A | 11/1975 | Milton |
| 3,846,010 A | 11/1974 | Love et al. | | 3,919,037 A | 11/1975 | Miller |
| 3,852,524 A | 12/1974 | Ando et al. | | 3,919,678 A | 11/1975 | Penfold |
| 3,856,000 A | 12/1974 | Chikama | | 3,920,432 A | 11/1975 | Smith |
| 3,856,127 A | 12/1974 | Halfon et al. | | 3,922,063 A | 11/1975 | Marrone |
| 3,861,781 A | 1/1975 | Hasegawa et al. | | 3,922,064 A | 11/1975 | Clark et al. |
| 3,864,016 A | 2/1975 | Dakss et al. | | 3,923,371 A | 12/1975 | Dalgleish |
| 3,864,018 A | 2/1975 | Miller | | 3,923,373 A | 12/1975 | Dabby et al. |
| 3,864,019 A | 2/1975 | Smolinsky et al. | | 3,923,375 A | 12/1975 | Bowerman |
| 3,868,294 A | 2/1975 | Gayle | | 3,923,376 A | 12/1975 | Martin |
| 3,870,395 A | 3/1975 | Schicketanz | | 3,923,377 A | 12/1975 | Milton |
| 3,870,396 A | 3/1975 | Racki et al. | | 3,923,410 A | 12/1975 | Jordan et al. |
| 3,870,398 A | 3/1975 | Love | | 3,928,102 A | 12/1975 | Rowe et al. |
| 3,871,742 A | 3/1975 | Kaminow et al. | | 3,931,518 A | 1/1976 | Miller |
| 3,871,744 A | 3/1975 | Bridger et al. | | 3,932,023 A | 1/1976 | Humer |
| 3,871,935 A | 3/1975 | Gloge et al. | | 3,932,184 A | 1/1976 | Cohen et al. |
| 3,872,236 A | 3/1975 | Swengel, Sr. et al. | | 3,932,761 A | 1/1976 | Ramsey et al. |
| 3,873,183 A | 3/1975 | Lee et al. | | 3,933,409 A | 1/1976 | Kloots |
| 3,873,209 A | 3/1975 | Schinke et al. | | 3,933,455 A | 1/1976 | Chown |
| 3,874,779 A | 4/1975 | Thiel | | 3,936,141 A | 2/1976 | Milton |
| 3,874,780 A | 4/1975 | Love | | 3,936,142 A | 2/1976 | Kersten |
| 3,874,781 A | 4/1975 | Thiel | | 3,936,143 A | 2/1976 | Sato |
| 3,875,422 A | 4/1975 | Stolen | | 3,936,144 A | 2/1976 | Caton |
| 3,876,900 A | 4/1975 | Amatsuka et al. | | 3,936,145 A | 2/1976 | McCartney |
| 3,877,052 A | 4/1975 | Dixon et al. | | 3,936,631 A | 2/1976 | Muska |
| 3,877,784 A | 4/1975 | Lin | | 3,937,557 A | 2/1976 | Milton |
| 3,878,397 A | 4/1975 | Robb et al. | | 3,937,560 A | 2/1976 | Milton |
| 3,879,606 A | 4/1975 | Bean | | 3,937,952 A | 2/1976 | Ripley et al. |
| 3,880,452 A | 4/1975 | Fields | | 3,938,895 A | 2/1976 | Bridger et al. |
| 3,883,217 A | 5/1975 | Love et al. | | 3,939,439 A | 2/1976 | Fletcher et al. |
| 3,883,221 A | 5/1975 | Rigrod | | 3,941,485 A | 3/1976 | Madden |
| 3,883,222 A | 5/1975 | Gunderson | | 3,944,326 A | 3/1976 | Tacke et al. |
| 3,883,223 A | 5/1975 | Hudson | | 3,944,327 A | 3/1976 | Larsen |
| 3,883,353 A | 5/1975 | Cohen et al. | | 3,944,328 A | 3/1976 | Kent et al. |
| 3,883,681 A | 5/1975 | Campbell | | 3,944,812 A | 3/1976 | Hattori et al. |
| 3,883,772 A | 5/1975 | Wako et al. | | 3,946,467 A | 3/1976 | Lukas et al. |
| 3,884,549 A | 5/1975 | Wang et al. | | 3,947,088 A | 3/1976 | French |
| 3,885,859 A | 5/1975 | Dalgleish et al. | | 3,947,182 A | 3/1976 | McCartney |
| 3,886,544 A | 5/1975 | Narodny | | 3,948,582 A | 4/1976 | Martin |
| 3,891,302 A | 6/1975 | Dabby et al. | | 3,948,583 A | 4/1976 | Tien |
| 3,894,789 A | 7/1975 | Kobayashi et al. | | 3,949,318 A | 4/1976 | Zeidler |
| 3,896,305 A | 7/1975 | Ostrowsky et al. | | 3,950,075 A | 4/1976 | Cook et al. |
| 3,897,134 A | 7/1975 | Scrivo et al. | | 3,951,514 A | 4/1976 | Medina, Jr. |
| 3,897,135 A | 7/1975 | Dyott | | 3,951,515 A | 4/1976 | Allard |
| 3,898,585 A | 8/1975 | Heidrich et al. | | 3,952,265 A | 4/1976 | Hunsperger |
| 3,899,235 A | 8/1975 | Arnaud et al. | | 3,954,323 A | 5/1976 | Andrews et al. |

| | | | | | |
|---|---|---|---|---|---|
| 3,954,338 A | 5/1976 | Hennel et al. | 4,023,886 A | 5/1977 | Nakayama et al. |
| 3,957,341 A | 5/1976 | Taylor | 4,023,887 A | 5/1977 | Speers |
| 3,958,114 A | 5/1976 | Codrino | 4,025,157 A | 5/1977 | Martin |
| 3,958,861 A | 5/1976 | Roberts | 4,025,158 A | 5/1977 | Tsuyama |
| 3,960,531 A | 6/1976 | Kohanzadeh et al. | 4,026,632 A | 5/1977 | Hill et al. |
| 3,962,702 A | 6/1976 | Kriege | 4,026,633 A | 5/1977 | Crick |
| 3,963,308 A | 6/1976 | Lebduska | 4,026,972 A | 5/1977 | Phillips et al. |
| 3,963,323 A | 6/1976 | Arnold | 4,027,153 A | 5/1977 | Kach |
| 3,964,819 A | 6/1976 | Auracher | 4,027,938 A | 6/1977 | Lewis |
| 3,966,299 A | 6/1976 | Osterfield et al. | 4,027,945 A | 6/1977 | Iverson |
| 3,967,123 A | 6/1976 | Deylius et al. | 4,028,162 A | 6/1977 | Cherin et al. |
| 3,967,877 A | 7/1976 | Heidrich et al. | 4,029,390 A | 6/1977 | Chinnock et al. |
| 3,967,878 A | 7/1976 | Caton | 4,029,391 A | 6/1977 | French |
| 3,968,564 A | 7/1976 | Springthorpe | 4,030,810 A | 6/1977 | Khoe |
| 3,969,014 A | 7/1976 | Auracher | 4,030,811 A | 6/1977 | Khoe et al. |
| 3,969,015 A | 7/1976 | Le Noane | 4,032,216 A | 6/1977 | Henry |
| 3,969,016 A | 7/1976 | Kaiser et al. | 4,032,217 A | 6/1977 | Coeure et al. |
| 3,970,360 A | 7/1976 | Kersten et al. | 4,033,668 A | 7/1977 | Presby |
| 3,970,958 A | 7/1976 | Streifer et al. | 4,035,058 A | 7/1977 | Papuchon |
| 3,970,959 A | 7/1976 | Wang et al. | 4,035,742 A | 7/1977 | Schiffner |
| 3,972,585 A | 8/1976 | Dalgleish et al. | 4,037,113 A | 7/1977 | Moore |
| 3,975,082 A | 8/1976 | Winzer | 4,038,650 A | 7/1977 | Evans et al. |
| 3,976,355 A | 8/1976 | Matthews | 4,039,249 A | 8/1977 | Kaminow et al. |
| 3,977,762 A | 8/1976 | Sandbank | 4,039,250 A | 8/1977 | Gaertner |
| 3,977,763 A | 8/1976 | Ostrowsky et al. | 4,039,337 A | 8/1977 | Brown et al. |
| 3,977,764 A | 8/1976 | D'Auria et al. | 4,040,691 A | 8/1977 | David et al. |
| 3,978,426 A | 8/1976 | Logan et al. | 4,042,823 A | 8/1977 | Decker et al. |
| 3,980,391 A | 9/1976 | Stewart | 4,043,026 A | 8/1977 | Weidhaas et al. |
| 3,982,060 A | 9/1976 | Avery et al. | 4,045,120 A | 8/1977 | de Corlieu et al. |
| 3,982,123 A | 9/1976 | Goell et al. | 4,045,121 A | 8/1977 | Clark |
| 3,982,810 A | 9/1976 | Tamir et al. | 4,046,453 A | 9/1977 | Fiebelkorn et al. |
| 3,982,815 A | 9/1976 | Nakayama | 4,046,454 A | 9/1977 | Pugh, III |
| 3,984,172 A | 10/1976 | Miller | 4,047,283 A | 9/1977 | Kunze |
| 3,984,174 A | 10/1976 | Landgreen | 4,047,795 A | 9/1977 | Hughes et al. |
| 3,985,424 A | 10/1976 | Steinacher | 4,047,796 A | 9/1977 | Kao et al. |
| 3,986,020 A | 10/1976 | Kogelnik | 4,047,797 A | 9/1977 | Arnold et al. |
| 3,987,398 A | 10/1976 | Fung | 4,048,591 A | 9/1977 | Auracher |
| 3,989,567 A | 11/1976 | Tardy | 4,049,414 A | 9/1977 | Smith |
| 3,990,012 A | 11/1976 | Karnes | 4,050,781 A | 9/1977 | Beauhaire |
| 3,990,059 A | 11/1976 | Carlo et al. | 4,050,782 A | 9/1977 | Uchida et al. |
| 3,990,779 A | 11/1976 | McCartney | 4,050,783 A | 9/1977 | Tardy |
| 3,991,318 A | 11/1976 | Duguay | 4,050,784 A | 9/1977 | Kobayashi |
| 3,993,400 A | 11/1976 | Leib | 4,053,764 A | 10/1977 | Sierak et al. |
| 3,994,559 A | 11/1976 | Crow et al. | 4,054,363 A | 10/1977 | Suematsu |
| 3,995,155 A | 11/1976 | Hutcheson et al. | 4,054,364 A | 10/1977 | Webster |
| 3,995,238 A | 11/1976 | Knox et al. | 4,054,366 A | 10/1977 | Barnoski et al. |
| 3,995,311 A | 11/1976 | Taylor | 4,056,305 A | 11/1977 | McCartney et al. |
| 3,995,935 A | 12/1976 | McCartney | 4,057,319 A | 11/1977 | Ash et al. |
| 3,996,526 A | 12/1976 | D'Auria et al. | 4,057,448 A | 11/1977 | Miller |
| 3,996,576 A | 12/1976 | Bullock | 4,057,719 A | 11/1977 | Lewis |
| 3,999,837 A | 12/1976 | Bowen et al. | 4,059,338 A | 11/1977 | Hartelius, Jr. |
| 3,999,841 A | 12/1976 | Dakss et al. | 4,060,308 A | 11/1977 | Barnoski et al. |
| 4,001,704 A | 1/1977 | Danielmeyer et al. | 4,060,309 A | 11/1977 | Le Noane et al. |
| 4,002,997 A | 1/1977 | Thompson | 4,061,416 A | 12/1977 | Stewart |
| 4,003,629 A | 1/1977 | Baues et al. | 4,062,043 A | 12/1977 | Zeidler et al. |
| 4,006,963 A | 2/1977 | Baues et al. | 4,062,620 A | 12/1977 | Pirolli |
| 4,006,964 A | 2/1977 | Mahlein et al. | 4,062,624 A | 12/1977 | Hammer |
| 4,008,948 A | 2/1977 | Dalgleish et al. | 4,064,460 A | 12/1977 | Gargini |
| 4,009,931 A | 3/1977 | Malsby et al. | 4,065,203 A | 12/1977 | Goell et al. |
| 4,011,005 A | 3/1977 | Hawkes et al. | 4,065,677 A | 12/1977 | Micheron et al. |
| 4,012,113 A | 3/1977 | Kogelnik et al. | 4,067,642 A | 1/1978 | King et al. |
| 4,013,342 A | 3/1977 | Narodny | 4,067,643 A | 1/1978 | Sugimura et al. |
| 4,015,893 A | 4/1977 | Sugano et al. | 4,067,937 A | 1/1978 | Unno et al. |
| 4,015,894 A | 4/1977 | Rocton | 4,068,121 A | 1/1978 | Bringhurst et al. |
| 4,017,149 A | 4/1977 | Kao | 4,068,952 A | 1/1978 | Erbert et al. |
| 4,017,150 A | 4/1977 | Imai | 4,070,093 A | 1/1978 | Schwartz |
| 4,018,506 A | 4/1977 | Hammer | 4,071,753 A | 1/1978 | Fulenwider et al. |
| 4,019,051 A | 4/1977 | Miller | 4,072,399 A | 2/1978 | Love |
| 4,019,241 A | 4/1977 | Logan | 4,074,415 A | 2/1978 | Stieff |
| 4,019,806 A | 4/1977 | Fellows et al. | 4,075,477 A | 2/1978 | Hanson |
| 4,021,099 A | 5/1977 | Kawasaki et al. | 4,076,375 A | 2/1978 | Muska et al. |

| | | | | | |
|---|---|---|---|---|---|
| 4,076,376 A | 2/1978 | Slaughter | 4,110,000 A | 8/1978 | Bogar et al. |
| 4,076,379 A | 2/1978 | Chouinard | 4,111,521 A | 9/1978 | Streifer et al. |
| 4,076,381 A | 2/1978 | Hammer | 4,111,522 A | 9/1978 | Auracher et al. |
| 4,077,699 A | 3/1978 | Dyott et al. | 4,111,524 A | 9/1978 | Tomlinson, III |
| 4,077,701 A | 3/1978 | Steensma et al. | 4,112,293 A | 9/1978 | Kach |
| 4,077,702 A | 3/1978 | Kunze et al. | 4,113,345 A | 9/1978 | Gerndt |
| 4,078,437 A | 3/1978 | Hill | 4,113,346 A | 9/1978 | Jackson et al. |
| 4,078,851 A | 3/1978 | Albanese | 4,113,347 A | 9/1978 | Gaertner |
| 4,078,852 A | 3/1978 | Lebduska | 4,113,353 A | 9/1978 | Matsushita |
| 4,079,927 A | 3/1978 | Rocton | 4,114,979 A | 9/1978 | Heldt |
| 4,080,044 A | 3/1978 | Gousseau | 4,116,531 A | 9/1978 | Greenwood |
| 4,081,208 A | 3/1978 | Meade | 4,116,532 A | 9/1978 | Hubbard et al. |
| 4,081,672 A | 3/1978 | Caspers et al. | 4,116,655 A | 9/1978 | Lewis |
| 4,082,419 A | 4/1978 | Thompson et al. | 4,118,100 A | 10/1978 | Goell et al. |
| 4,082,421 A | 4/1978 | Auracher et al. | 4,118,105 A | 10/1978 | Voigt |
| 4,082,424 A | 4/1978 | Sauter et al. | 4,118,270 A | 10/1978 | Pan et al. |
| 4,082,425 A | 4/1978 | Miller | 4,118,618 A | 10/1978 | Gauthier et al. |
| 4,082,435 A | 4/1978 | Zeitz | 4,118,676 A | 10/1978 | Redman |
| 4,083,625 A | 4/1978 | Hudson | 4,119,362 A | 10/1978 | Holzman |
| 4,084,882 A | 4/1978 | Hogan et al. | 4,119,363 A | 10/1978 | Camlibel et al. |
| 4,086,001 A | 4/1978 | Chen et al. | 4,121,884 A | 10/1978 | Greenwood |
| 4,087,155 A | 5/1978 | Deacon | 4,121,890 A | 10/1978 | Braun |
| 4,087,156 A | 5/1978 | Kao et al. | 4,123,137 A | 10/1978 | Marcatili |
| 4,087,157 A | 5/1978 | Hodges | 4,123,138 A | 10/1978 | Morrison |
| 4,087,158 A | 5/1978 | Lewis et al. | 4,123,139 A | 10/1978 | Sandahl |
| 4,087,159 A | 5/1978 | Ulrich | 4,124,270 A | 11/1978 | Cheo |
| 4,088,386 A | 5/1978 | Hawk | 4,124,271 A | 11/1978 | Green |
| 4,088,387 A | 5/1978 | Lewis | 4,124,272 A | 11/1978 | Henderson et al. |
| 4,088,389 A | 5/1978 | Zucker et al. | 4,124,364 A | 11/1978 | Dalgoutte |
| 4,088,390 A | 5/1978 | McCartney | 4,125,315 A | 11/1978 | Altman et al. |
| 4,089,583 A | 5/1978 | Auracher et al. | 4,125,768 A | 11/1978 | Jackson et al. |
| 4,089,584 A | 5/1978 | Polczynski | 4,127,319 A | 11/1978 | Forney, Jr. et al. |
| 4,090,067 A | 5/1978 | Bell, III et al. | 4,127,320 A | 11/1978 | Li |
| 4,090,221 A | 5/1978 | Connor | 4,128,301 A | 12/1978 | Burns et al. |
| 4,090,777 A | 5/1978 | Wittke | 4,128,302 A | 12/1978 | Di Vita |
| 4,090,778 A | 5/1978 | Phillips et al. | 4,129,932 A | 12/1978 | Stancati |
| 4,092,059 A | 5/1978 | Hawkes et al. | 4,130,243 A | 12/1978 | Stevens |
| 4,092,061 A | 5/1978 | Stigliani, Jr. | 4,130,341 A | 12/1978 | Stieff |
| 4,093,339 A | 6/1978 | Cross | 4,130,343 A | 12/1978 | Miller et al. |
| 4,093,341 A | 6/1978 | Crick | 4,130,344 A | 12/1978 | Lemonde |
| 4,094,578 A | 6/1978 | DiVita et al. | 4,130,345 A | 12/1978 | Doellner |
| 4,094,579 A | 6/1978 | McMahon et al. | 4,132,461 A | 1/1979 | Jacques et al. |
| 4,094,580 A | 6/1978 | Cook et al. | 4,133,601 A | 1/1979 | Le Guen et al. |
| 4,095,872 A | 6/1978 | Stieff et al. | 4,134,639 A | 1/1979 | Di Vita |
| 4,097,117 A | 6/1978 | Neil et al. | 4,134,640 A | 1/1979 | Auracher et al. |
| 4,097,118 A | 6/1978 | Hammer | 4,134,641 A | 1/1979 | Kao et al. |
| 4,097,129 A | 6/1978 | Wellington et al. | 4,135,202 A | 1/1979 | Cutler |
| 4,099,832 A | 7/1978 | Warner, Jr. | 4,135,779 A | 1/1979 | Hudson |
| 4,099,833 A | 7/1978 | Tosswill | 4,135,780 A | 1/1979 | Dyott |
| 4,101,196 A | 7/1978 | Imai | 4,135,781 A | 1/1979 | Archer |
| 4,101,197 A | 7/1978 | Kent et al. | 4,135,782 A | 1/1979 | Beauhaire |
| 4,101,198 A | 7/1978 | Heldt | 4,135,783 A | 1/1979 | Kunze |
| 4,102,559 A | 7/1978 | Hunzinger | 4,136,929 A | 1/1979 | Suzaki |
| 4,102,560 A | 7/1978 | Miller | 4,137,060 A | 1/1979 | Timmermann |
| 4,102,561 A | 7/1978 | Hawk et al. | 4,138,196 A | 2/1979 | Redman |
| 4,102,579 A | 7/1978 | Stewart | 4,139,259 A | 2/1979 | Kersten et al. |
| 4,103,153 A | 7/1978 | Matsumoto et al. | 4,139,260 A | 2/1979 | Bouygues et al. |
| 4,103,154 A | 7/1978 | D'Auria et al. | 4,140,365 A | 2/1979 | Burger et al. |
| 4,103,987 A | 8/1978 | Kersten | 4,140,366 A | 2/1979 | Makuch et al. |
| 4,105,285 A | 8/1978 | Bedgood et al. | 4,140,367 A | 2/1979 | Makuch et al. |
| 4,105,332 A | 8/1978 | Hohne et al. | 4,140,505 A | 2/1979 | Ramsay et al. |
| 4,106,848 A | 8/1978 | Conwell et al. | 4,142,774 A | 3/1979 | Wright |
| 4,106,849 A | 8/1978 | Stieff | 4,142,776 A | 3/1979 | Cherin et al. |
| 4,107,242 A | 8/1978 | Runge | 4,142,777 A | 3/1979 | Gauthier et al. |
| 4,107,517 A | 8/1978 | Cooper | 4,142,877 A | 3/1979 | Auracher et al. |
| 4,108,534 A | 8/1978 | Le Noane et al. | 4,143,940 A | 3/1979 | Khoe |
| 4,108,622 A | 8/1978 | Martin | 4,143,941 A | 3/1979 | Soref |
| 4,109,146 A | 8/1978 | Hillman | 4,145,110 A | 3/1979 | Szentesi |
| 4,109,369 A | 8/1978 | Taylor | 4,145,457 A | 3/1979 | Kersten |
| 4,109,994 A | 8/1978 | Chown | 4,146,298 A | 3/1979 | Szczepanek |
| 4,109,997 A | 8/1978 | Iverson | 4,146,299 A | 3/1979 | Wellington et al. |

| | | | | | | |
|---|---|---|---|---|---|---|
| 4,146,300 A | 3/1979 | Kaiser | | 4,176,908 A | 12/1979 | Wagner |
| 4,146,301 A | 3/1979 | Cherin et al. | | 4,176,909 A | 12/1979 | Prunier |
| 4,147,402 A | 4/1979 | Chown | | 4,178,066 A | 12/1979 | Di Vita |
| 4,147,403 A | 4/1979 | D'Auria et al. | | 4,178,067 A | 12/1979 | Johnson et al. |
| 4,147,404 A | 4/1979 | Hensel | | 4,178,068 A | 12/1979 | Hoover |
| 4,147,405 A | 4/1979 | Spainhour | | 4,179,185 A | 12/1979 | Hawk |
| 4,148,553 A | 4/1979 | Asam | | 4,179,186 A | 12/1979 | Tynes |
| 4,148,554 A | 4/1979 | Magnusson et al. | | 4,179,801 A | 12/1979 | Hollis |
| 4,148,556 A | 4/1979 | Sauter et al. | | 4,181,397 A | 1/1980 | Baker et al. |
| 4,148,557 A | 4/1979 | Garvey | | 4,181,398 A | 1/1980 | Sick |
| 4,148,558 A | 4/1979 | Schuck | | 4,181,399 A | 1/1980 | McMahon et al. |
| 4,148,559 A | 4/1979 | Gauthier | | 4,181,400 A | 1/1980 | Malsot et al. |
| 4,149,072 A | 4/1979 | Smith et al. | | 4,181,401 A | 1/1980 | Jensen |
| 4,149,770 A | 4/1979 | Milton et al. | | 4,181,402 A | 1/1980 | Borsuk et al. |
| 4,149,771 A | 4/1979 | Epworth et al. | | 4,181,515 A | 1/1980 | Dyott et al. |
| 4,150,870 A | 4/1979 | D'Auria | | 4,182,017 A | 1/1980 | Ford et al. |
| 4,151,030 A | 4/1979 | Hensel | | 4,182,543 A | 1/1980 | Wied et al. |
| 4,152,043 A | 5/1979 | Albanese | | 4,182,544 A | 1/1980 | McMahon |
| 4,152,045 A | 5/1979 | Hammer | | 4,182,545 A | 1/1980 | Greer |
| 4,153,328 A | 5/1979 | Wang | | 4,182,546 A | 1/1980 | Lukas et al. |
| 4,153,329 A | 5/1979 | Gillette | | 4,182,935 A | 1/1980 | Chown |
| 4,153,330 A | 5/1979 | Tomlinson, III | | 4,183,054 A | 1/1980 | Patisaul et al. |
| 4,153,331 A | 5/1979 | Cross | | 4,183,615 A | 1/1980 | Rush |
| 4,154,524 A | 5/1979 | Hattori et al. | | 4,183,616 A | 1/1980 | Benoit et al. |
| 4,155,624 A | 5/1979 | Logan et al. | | 4,183,617 A | 1/1980 | Isaacs et al. |
| 4,156,206 A | 5/1979 | Comerford et al. | | 4,183,618 A | 1/1980 | Rush et al. |
| 4,156,556 A | 5/1979 | Klein et al. | | 4,183,619 A | 1/1980 | Makuch |
| 4,157,209 A | 6/1979 | Amendolia | | 4,183,737 A | 1/1980 | Chown et al. |
| 4,158,476 A | 6/1979 | McCartney | | 4,184,738 A | 1/1980 | Wright |
| 4,158,477 A | 6/1979 | Phillips et al. | | 4,184,739 A | 1/1980 | D'Auria et al. |
| 4,159,418 A | 6/1979 | Marom | | 4,184,740 A | 1/1980 | d'Auria et al. |
| 4,159,863 A | 7/1979 | Stewart | | 4,184,741 A | 1/1980 | Hawk et al. |
| 4,160,580 A | 7/1979 | Le Noane et al. | | 4,184,742 A | 1/1980 | Corrales |
| 4,161,347 A | 7/1979 | Tardy | | 4,185,256 A | 1/1980 | Scifres et al. |
| 4,161,348 A | 7/1979 | Ulrich | | 4,185,274 A | 1/1980 | Giallorenzi |
| 4,161,650 A | 7/1979 | Caouette et al. | | 4,185,883 A | 1/1980 | Chown et al. |
| 4,162,119 A | 7/1979 | Goodman | | 4,185,884 A | 1/1980 | McMahon |
| 4,162,821 A | 7/1979 | Schumacher | | 4,185,885 A | 1/1980 | Chown et al. |
| 4,163,601 A | 8/1979 | Olshansky | | 4,185,886 A | 1/1980 | Corrales |
| 4,164,104 A | 8/1979 | Carpenter et al. | | 4,186,409 A | 1/1980 | McMullin |
| 4,164,363 A | 8/1979 | Hsu | | 4,186,425 A | 1/1980 | Nadimi |
| 4,164,364 A | 8/1979 | Witte | | 4,186,994 A | 2/1980 | Denkin et al. |
| 4,165,150 A | 8/1979 | Duck et al. | | 4,186,995 A | 2/1980 | Schumacher |
| 4,165,225 A | 8/1979 | Auracher et al. | | 4,186,996 A | 2/1980 | Bowen et al. |
| 4,165,496 A | 8/1979 | Di Domenico, Jr. et al. | | 4,186,997 A | 2/1980 | Schumacher |
| 4,165,913 A | 8/1979 | Fitch | | 4,186,998 A | 2/1980 | Holzman |
| 4,165,914 A | 8/1979 | Villarruel et al. | | 4,186,999 A | 2/1980 | Harwood et al. |
| 4,166,212 A | 8/1979 | Judeinstein | | 4,188,087 A | 2/1980 | D'Auria et al. |
| 4,166,668 A | 9/1979 | MacLeod | | 4,188,708 A | 2/1980 | Frederiksen |
| 4,166,672 A | 9/1979 | Gilbert | | 4,189,206 A | 2/1980 | Terai et al. |
| 4,166,946 A | 9/1979 | Chown et al. | | 4,189,233 A | 2/1980 | Hurt et al. |
| 4,167,303 A | 9/1979 | Bowen et al. | | 4,190,315 A | 2/1980 | Brettle et al. |
| 4,167,304 A | 9/1979 | Gelbke | | 4,190,316 A | 2/1980 | Malsby et al. |
| 4,167,328 A | 9/1979 | Cross et al. | | 4,190,317 A | 2/1980 | Makuch |
| 4,167,744 A | 9/1979 | Nyul | | 4,190,318 A | 2/1980 | Upton, Jr. |
| 4,167,746 A | 9/1979 | Storm | | 4,191,446 A | 3/1980 | Arditty et al. |
| 4,168,107 A | 9/1979 | Sauter | | 4,191,447 A | 3/1980 | Borsuk |
| 4,168,108 A | 9/1979 | Judeinstein | | 4,192,056 A | 3/1980 | Logan et al. |
| 4,168,109 A | 9/1979 | Dumire | | 4,192,574 A | 3/1980 | Henry et al. |
| 4,168,883 A | 9/1979 | MacLeod | | 4,192,575 A | 3/1980 | Hodge |
| 4,169,656 A | 10/1979 | Hodge | | 4,193,661 A | 3/1980 | D'Auria et al. |
| 4,170,731 A | 10/1979 | Howell et al. | | 4,193,662 A | 3/1980 | Hara |
| 4,171,867 A | 10/1979 | Cocito | | 4,193,663 A | 3/1980 | Timmermann |
| 4,172,212 A | 10/1979 | Heinzer | | 4,193,664 A | 3/1980 | Ellwood |
| 4,172,630 A | 10/1979 | Burns et al. | | 4,193,665 A | 3/1980 | Arnold |
| 4,172,631 A | 10/1979 | Yevick | | 4,194,162 A | 3/1980 | Uematsu et al. |
| 4,172,746 A | 10/1979 | Le Noane et al. | | 4,194,827 A | 3/1980 | Bleeker et al. |
| 4,173,389 A | 11/1979 | Curtis | | 4,195,045 A | 3/1980 | Mead |
| 4,173,390 A | 11/1979 | Kach | | 4,195,907 A | 4/1980 | Zamja et al. |
| 4,173,399 A | 11/1979 | Yevick | | 4,196,032 A | 4/1980 | Eggleston |
| 4,174,882 A | 11/1979 | McCartney | | 4,196,962 A | 4/1980 | Sick |

| | | | | | |
|---|---|---|---|---|---|
| 4,196,963 A | 4/1980 | Chen et al. | 4,220,397 A | 9/1980 | Benasutti |
| 4,196,964 A | 4/1980 | Papuchon | 4,220,398 A | 9/1980 | Dalgoutte |
| 4,196,965 A | 4/1980 | Matsuno | 4,220,411 A | 9/1980 | Cowen |
| 4,198,115 A | 4/1980 | Kaminow | 4,220,619 A | 9/1980 | Kersten |
| 4,198,116 A | 4/1980 | Papuchon | 4,221,460 A | 9/1980 | Hepner et al. |
| 4,198,117 A | 4/1980 | Kobayashi | 4,221,461 A | 9/1980 | Bair |
| 4,198,118 A | 4/1980 | Porter | 4,222,628 A | 9/1980 | Righini et al. |
| 4,198,119 A | 4/1980 | Uberbacher | 4,222,629 A | 9/1980 | Dassele et al. |
| 4,198,122 A | 4/1980 | Prunier et al. | 4,222,632 A | 9/1980 | Eichweber |
| 4,199,221 A | 4/1980 | Rivoallan et al. | 4,222,638 A | 9/1980 | Robert |
| 4,199,222 A | 4/1980 | Ikushima et al. | 4,223,973 A | 9/1980 | Tamburro |
| 4,199,223 A | 4/1980 | Yannoni | 4,223,976 A | 9/1980 | Zangiacomi et al. |
| 4,200,356 A | 4/1980 | Hawkes et al. | 4,223,977 A | 9/1980 | Papuchon et al. |
| 4,201,086 A | 5/1980 | Jones | 4,223,978 A | 9/1980 | Kummer et al. |
| 4,201,197 A | 5/1980 | Dismer | 4,223,979 A | 9/1980 | Piter et al. |
| 4,201,442 A | 5/1980 | McMahon et al. | 4,225,213 A | 9/1980 | McBride, Jr. et al. |
| 4,201,443 A | 5/1980 | Hodge | 4,225,214 A | 9/1980 | Hodge et al. |
| 4,201,444 A | 5/1980 | McCartney et al. | 4,227,260 A | 10/1980 | Vojvodich et al. |
| 4,201,445 A | 5/1980 | Kunze | 4,227,769 A | 10/1980 | Phillips et al. |
| 4,201,446 A | 5/1980 | Geddes et al. | 4,227,939 A | 10/1980 | Zewail et al. |
| 4,201,447 A | 5/1980 | Thompson et al. | 4,227,951 A | 10/1980 | Mignien |
| 4,203,649 A | 5/1980 | Velasco et al. | 4,229,067 A | 10/1980 | Love |
| 4,203,650 A | 5/1980 | Millet et al. | 4,229,068 A | 10/1980 | Hodge et al. |
| 4,204,306 A | 5/1980 | Makuch | 4,229,402 A | 10/1980 | Villarruel et al. |
| 4,204,742 A | 5/1980 | Johnson et al. | 4,229,876 A | 10/1980 | Doty |
| 4,204,743 A | 5/1980 | Etaix | 4,232,385 A | 11/1980 | Hara et al. |
| 4,204,744 A | 5/1980 | Wittmann | 4,232,934 A | 11/1980 | Feinbloom |
| 4,204,866 A | 5/1980 | Horak et al. | 4,232,938 A | 11/1980 | Dabby et al. |
| 4,205,896 A | 6/1980 | Borsuk | 4,233,493 A | 11/1980 | Nath |
| 4,205,897 A | 6/1980 | Stankos | 4,233,619 A | 11/1980 | Webb et al. |
| 4,205,898 A | 6/1980 | Matthews et al. | 4,234,910 A | 11/1980 | Price |
| 4,206,251 A | 6/1980 | Chen | 4,234,968 A | 11/1980 | Singh |
| 4,207,583 A | 6/1980 | Temple | 4,234,969 A | 11/1980 | Singh |
| 4,208,091 A | 6/1980 | Cheo et al. | 4,234,970 A | 11/1980 | Beasley et al. |
| 4,208,092 A | 6/1980 | Monaghan et al. | 4,236,782 A | 12/1980 | Castera et al. |
| 4,208,093 A | 6/1980 | Borsuk | 4,236,783 A | 12/1980 | Hepner et al. |
| 4,208,094 A | 6/1980 | Tomlinson, III et al. | 4,236,784 A | 12/1980 | Palmer |
| 4,208,095 A | 6/1980 | Malsot | 4,236,785 A | 12/1980 | Papuchon et al. |
| 4,209,227 A | 6/1980 | Dubos et al. | 4,236,786 A | 12/1980 | Keck |
| 4,210,470 A | 7/1980 | Marinace | 4,236,787 A | 12/1980 | Iacono et al. |
| 4,210,803 A | 7/1980 | Ih | 4,236,791 A | 12/1980 | Krueger et al. |
| 4,210,923 A | 7/1980 | North et al. | 4,237,474 A | 12/1980 | Ladany |
| 4,211,467 A | 7/1980 | Cross et al. | 4,237,550 A | 12/1980 | Steensma |
| 4,211,468 A | 7/1980 | Steensma | 4,238,856 A | 12/1980 | Bucaro et al. |
| 4,211,469 A | 7/1980 | Holzman | 4,239,329 A | 12/1980 | Matsumoto |
| 4,211,470 A | 7/1980 | Stewart | 4,239,330 A | 12/1980 | Ashkin et al. |
| 4,211,920 A | 7/1980 | Wakabayashi | 4,239,331 A | 12/1980 | Aoyama |
| 4,212,512 A | 7/1980 | Hodge | 4,239,332 A | 12/1980 | Inbar |
| 4,212,513 A | 7/1980 | Gravel | 4,239,333 A | 12/1980 | Dakss et al. |
| 4,212,514 A | 7/1980 | Prunier et al. | 4,239,334 A | 12/1980 | Johnson |
| 4,212,660 A | 7/1980 | Maurer | 4,240,692 A | 12/1980 | Winston |
| 4,213,670 A | 7/1980 | Milton et al. | 4,240,693 A | 12/1980 | Johnson et al. |
| 4,213,671 A | 7/1980 | Lambert | 4,240,694 A | 12/1980 | Pan |
| 4,213,677 A | 7/1980 | Sugimoto et al. | 4,240,695 A | 12/1980 | Evans |
| 4,214,809 A | 7/1980 | Reh | 4,241,319 A | 12/1980 | Papayoanou |
| 4,214,810 A | 7/1980 | Stewart | 4,241,978 A | 12/1980 | Dubois et al. |
| 4,214,811 A | 7/1980 | Benoit et al. | 4,243,295 A | 1/1981 | Alferness |
| 4,214,812 A | 7/1980 | de Mendez | 4,243,296 A | 1/1981 | Aulich et al. |
| 4,215,913 A | 8/1980 | Turley et al. | 4,243,297 A | 1/1981 | Elion |
| 4,215,924 A | 8/1980 | Matsumoto | 4,243,332 A | 1/1981 | Hartmann |
| 4,215,937 A | 8/1980 | Borsuk | 4,243,399 A | 1/1981 | Khoe et al. |
| 4,217,028 A | 8/1980 | Reh et al. | 4,244,317 A | 1/1981 | Rauch |
| 4,217,029 A | 8/1980 | Kao | 4,245,883 A | 1/1981 | Johnson et al. |
| 4,217,030 A | 8/1980 | Howarth | 4,245,884 A | 1/1981 | Magura et al. |
| 4,217,031 A | 8/1980 | Mignien et al. | 4,245,885 A | 1/1981 | Hodge |
| 4,217,032 A | 8/1980 | Sheem | 4,245,886 A | 1/1981 | Kolodzey et al. |
| 4,217,598 A | 8/1980 | D'Auria et al. | 4,245,887 A | 1/1981 | Johnson |
| 4,218,113 A | 8/1980 | Uberbacher | 4,246,475 A | 1/1981 | Altman |
| 4,220,394 A | 9/1980 | Tardy | 4,247,163 A | 1/1981 | Lumpp et al. |
| 4,220,395 A | 9/1980 | Wang et al. | 4,247,164 A | 1/1981 | Mannschke |
| 4,220,396 A | 9/1980 | Antell | 4,247,858 A | 1/1981 | Eichweber |

| | | | | | |
|---|---|---|---|---|---|
| 4,247,956 A | 1/1981 | Christiansen et al. | 4,269,648 A | 5/1981 | Dakss et al. |
| 4,248,499 A | 2/1981 | Liertz et al. | 4,270,049 A | 5/1981 | Tanaka et al. |
| 4,249,266 A | 2/1981 | Nakamori | 4,270,839 A | 6/1981 | Cross |
| 4,249,794 A | 2/1981 | Haley | 4,272,154 A | 6/1981 | Bachel |
| 4,251,130 A | 2/1981 | Marcatili | 4,273,411 A | 6/1981 | Alferness |
| 4,252,402 A | 2/1981 | Puech et al. | 4,273,412 A | 6/1981 | Hillegonds |
| 4,252,403 A | 2/1981 | Salisbury | 4,273,413 A | 6/1981 | Bendiksen et al. |
| 4,252,404 A | 2/1981 | DiVita | 4,273,445 A | 6/1981 | Thompson et al. |
| 4,252,405 A | 2/1981 | Oldham | 4,274,049 A | 6/1981 | Stoll |
| 4,252,406 A | 2/1981 | Ryan, Jr. et al. | 4,274,705 A | 6/1981 | Miller |
| 4,252,407 A | 2/1981 | Bubanko et al. | 4,274,706 A | 6/1981 | Tangonan |
| 4,253,060 A | 2/1981 | Chen | 4,274,707 A | 6/1981 | Pacey et al. |
| 4,253,727 A | 3/1981 | Jeunhomme et al. | 4,274,708 A | 6/1981 | Cocito et al. |
| 4,253,728 A | 3/1981 | Venkatesan | 4,274,710 A | 6/1981 | Nagao |
| 4,253,729 A | 3/1981 | Rocton | 4,275,950 A | 6/1981 | Meyer |
| 4,253,730 A | 3/1981 | Logan et al. | 4,276,113 A | 6/1981 | Carlsen et al. |
| 4,254,865 A | 3/1981 | Pacey et al. | 4,276,643 A | 6/1981 | Laprie et al. |
| 4,255,015 A | 3/1981 | Adams et al. | 4,276,656 A | 6/1981 | Petryk, Jr. |
| 4,255,016 A | 3/1981 | Borsuk | 4,277,134 A | 7/1981 | Upton, Jr. |
| 4,255,017 A | 3/1981 | Hasegawa | 4,277,135 A | 7/1981 | Schrott et al. |
| 4,255,021 A | 3/1981 | Brunsden | 4,277,170 A | 7/1981 | Miles |
| 4,255,780 A | 3/1981 | Sakellaris | 4,278,321 A | 7/1981 | Mack et al. |
| 4,256,365 A | 3/1981 | Lemesle et al. | 4,278,322 A | 7/1981 | Mahlein |
| 4,257,124 A | 3/1981 | Porter et al. | 4,278,323 A | 7/1981 | Waldman |
| 4,257,671 A | 3/1981 | Barbaudy et al. | 4,278,327 A | 7/1981 | McMahon et al. |
| 4,257,672 A | 3/1981 | Balliet | 4,278,571 A | 7/1981 | Choy |
| 4,257,673 A | 3/1981 | Matthijsse | 4,279,464 A | 7/1981 | Colombini |
| 4,257,674 A | 3/1981 | Griffin et al. | 4,279,465 A | 7/1981 | Vojvodich |
| 4,258,976 A | 3/1981 | Scott et al. | 4,279,466 A | 7/1981 | Makuch et al. |
| 4,258,977 A | 3/1981 | Lukas et al. | 4,279,467 A | 7/1981 | Borsuk et al. |
| 4,259,609 A | 3/1981 | Month et al. | 4,279,468 A | 7/1981 | Turley et al. |
| 4,260,219 A | 4/1981 | Greubel et al. | 4,279,469 A | 7/1981 | Forman |
| 4,261,638 A | 4/1981 | Wagner | 4,280,751 A | 7/1981 | DiVita |
| 4,261,639 A | 4/1981 | Kogelnik et al. | 4,281,253 A | 7/1981 | Culver |
| 4,261,640 A | 4/1981 | Stankos et al. | 4,281,891 A | 8/1981 | Shinohara et al. |
| 4,261,641 A | 4/1981 | Porter | 4,281,892 A | 8/1981 | Sitabkhan |
| 4,261,642 A | 4/1981 | Lewis et al. | 4,281,893 A | 8/1981 | Yamada et al. |
| 4,261,643 A | 4/1981 | Stiles et al. | 4,281,925 A | 8/1981 | Forrest et al. |
| 4,261,644 A | 4/1981 | Giannaris | 4,281,931 A | 8/1981 | Chikama |
| 4,261,721 A | 4/1981 | Lewis | 4,282,527 A | 8/1981 | Winderman et al. |
| 4,261,774 A | 4/1981 | Lewis et al. | 4,283,113 A | 8/1981 | Eden |
| 4,262,362 A | 4/1981 | Kiernan et al. | 4,283,114 A | 8/1981 | Wandrack |
| 4,262,992 A | 4/1981 | Berthold, III | 4,283,125 A | 8/1981 | Borsuk |
| 4,262,993 A | 4/1981 | Burns et al. | 4,284,449 A | 8/1981 | Stone |
| 4,262,994 A | 4/1981 | Sheem | 4,285,569 A | 8/1981 | Yao et al. |
| 4,262,995 A | 4/1981 | Tangonan | 4,285,570 A | 8/1981 | Minemura et al. |
| 4,262,996 A | 4/1981 | Yao | 4,285,572 A | 8/1981 | Beaudette et al. |
| 4,264,124 A | 4/1981 | Greubel et al. | 4,286,232 A | 8/1981 | Puech et al. |
| 4,264,125 A | 4/1981 | Shibata | 4,286,838 A | 9/1981 | Huignard et al. |
| 4,264,126 A | 4/1981 | Sheem | 4,287,414 A | 9/1981 | Soo et al. |
| 4,264,127 A | 4/1981 | Schumacher et al. | 4,288,143 A | 9/1981 | Di Vita |
| 4,264,129 A | 4/1981 | Warkentine | 4,288,785 A | 9/1981 | Papuchon et al. |
| 4,265,122 A | 5/1981 | Cook et al. | 4,289,373 A | 9/1981 | Sugimoto et al. |
| 4,265,128 A | 5/1981 | Ohshima | 4,289,374 A | 9/1981 | Franken et al. |
| 4,265,511 A | 5/1981 | Nicia et al. | 4,289,398 A | 9/1981 | Robichaud |
| 4,265,512 A | 5/1981 | Chiron et al. | 4,290,142 A | 9/1981 | Schnee et al. |
| 4,265,513 A | 5/1981 | Matsushita et al. | 4,290,667 A | 9/1981 | Chown |
| 4,265,514 A | 5/1981 | Wellington et al. | 4,290,668 A | 9/1981 | Ellis et al. |
| 4,265,541 A | 5/1981 | Leclerc et al. | 4,291,939 A | 9/1981 | Giallorenzi et al. |
| 4,265,689 A | 5/1981 | Jeffrey | 4,291,940 A | 9/1981 | Kawasaki et al. |
| 4,265,699 A | 5/1981 | Ladany | 4,291,941 A | 9/1981 | Melzer |
| 4,266,850 A | 5/1981 | Burns | 4,291,942 A | 9/1981 | Henry et al. |
| 4,266,851 A | 5/1981 | Salisbury | 4,291,943 A | 9/1981 | Binek et al. |
| 4,266,852 A | 5/1981 | Higgins et al. | 4,292,628 A | 9/1981 | Sadler |
| 4,266,853 A | 5/1981 | Hutchins et al. | 4,293,188 A | 10/1981 | McMahon |
| 4,267,819 A | 5/1981 | Claesson | 4,294,507 A | 10/1981 | Johnson |
| 4,268,112 A | 5/1981 | Peterson | 4,294,508 A | 10/1981 | Husbands |
| 4,268,113 A | 5/1981 | Noel, Jr. | 4,294,509 A | 10/1981 | Nagao |
| 4,268,114 A | 5/1981 | D'Auria et al. | 4,294,510 A | 10/1981 | Chappell |
| 4,268,115 A | 5/1981 | Slemon et al. | 4,294,511 A | 10/1981 | Yamashita et al. |
| 4,268,116 A | 5/1981 | Schmadel et al. | 4,294,512 A | 10/1981 | Logan |

| | | | | | |
|---|---|---|---|---|---|
| 4,294,513 A | 10/1981 | Nelson et al. | 4,318,058 A | 3/1982 | Mito et al. |
| 4,295,043 A | 10/1981 | Eibner et al. | 4,318,586 A | 3/1982 | Coyne |
| 4,295,152 A | 10/1981 | Khoe et al. | 4,318,587 A | 3/1982 | Grassl |
| 4,295,707 A | 10/1981 | Nakai et al. | 4,319,802 A | 3/1982 | Bowes |
| 4,296,143 A | 10/1981 | Franken et al. | 4,319,902 A | 3/1982 | Hensel |
| 4,296,319 A | 10/1981 | Franks et al. | 4,319,951 A | 3/1982 | Korbelak et al. |
| 4,296,995 A | 10/1981 | Bickel | 4,320,475 A | 3/1982 | Leclerc et al. |
| 4,296,996 A | 10/1981 | Niiro et al. | 4,320,938 A | 3/1982 | Gunnersen et al. |
| 4,296,997 A | 10/1981 | Malsot et al. | 4,322,126 A | 3/1982 | Minowa et al. |
| 4,296,998 A | 10/1981 | Dufft | 4,322,127 A | 3/1982 | Comerford et al. |
| 4,296,999 A | 10/1981 | Mead | 4,322,854 A | 3/1982 | Bundens et al. |
| 4,297,000 A | 10/1981 | Fries | 4,323,300 A | 4/1982 | Stewart et al. |
| 4,297,651 A | 10/1981 | Dyment et al. | 4,324,492 A | 4/1982 | Drenckhan et al. |
| 4,297,684 A | 10/1981 | Butter | 4,325,603 A | 4/1982 | Marom |
| 4,297,704 A | 10/1981 | Marom et al. | 4,325,604 A | 4/1982 | Witte |
| 4,299,393 A | 11/1981 | Benckert et al. | 4,325,605 A | 4/1982 | Winzer et al. |
| 4,300,239 A | 11/1981 | Wakabayashi et al. | 4,325,606 A | 4/1982 | Ikuno et al. |
| 4,300,811 A | 11/1981 | Ettenberg et al. | 4,325,607 A | 4/1982 | Carlsen |
| 4,300,813 A | 11/1981 | Gravel | 4,325,636 A | 4/1982 | Schiffner |
| 4,300,814 A | 11/1981 | Carenco | 4,326,771 A | 4/1982 | Henry et al. |
| 4,300,815 A | 11/1981 | Malsot et al. | 4,327,340 A | 4/1982 | Coldren |
| 4,301,462 A | 11/1981 | Lowry | 4,327,962 A | 5/1982 | Redman |
| 4,301,543 A | 11/1981 | Palmer | 4,327,963 A | 5/1982 | Khoe et al. |
| 4,302,069 A | 11/1981 | Niemi | 4,327,964 A | 5/1982 | Haesly et al. |
| 4,302,070 A | 11/1981 | Nakayama et al. | 4,328,488 A | 5/1982 | Yanai et al. |
| 4,302,071 A | 11/1981 | Winzer | 4,329,016 A | 5/1982 | Chen |
| 4,302,072 A | 11/1981 | Vucins | 4,329,017 A | 5/1982 | Kapany et al. |
| 4,302,267 A | 11/1981 | Palmer et al. | 4,329,535 A | 5/1982 | Rapp |
| 4,303,300 A | 12/1981 | Pressiat et al. | 4,329,659 A | 5/1982 | Chen |
| 4,303,301 A | 12/1981 | Teichert et al. | 4,330,170 A | 5/1982 | Johnson et al. |
| 4,303,302 A | 12/1981 | Ramsey et al. | 4,330,171 A | 5/1982 | Malsot et al. |
| 4,303,303 A | 12/1981 | Aoyama | 4,330,172 A | 5/1982 | Monaghan et al. |
| 4,303,304 A | 12/1981 | Ruiz | 4,332,435 A | 6/1982 | Post |
| 4,304,460 A | 12/1981 | Tanaka et al. | 4,332,439 A | 6/1982 | Lubbers et al. |
| 4,304,461 A | 12/1981 | Stewart et al. | 4,333,704 A | 6/1982 | Steinberg |
| 4,305,640 A | 12/1981 | Cullis et al. | 4,333,705 A | 6/1982 | Mead |
| 4,305,641 A | 12/1981 | Witte | 4,334,774 A | 6/1982 | Glass et al. |
| 4,305,642 A | 12/1981 | Bloodworth, Jr. et al. | 4,335,933 A | 6/1982 | Palmer |
| 4,306,716 A | 12/1981 | James et al. | 4,336,047 A | 6/1982 | Pavlopoulos et al. |
| 4,306,765 A | 12/1981 | Winzer et al. | 4,336,977 A | 6/1982 | Monaghan et al. |
| 4,306,766 A | 12/1981 | Karol | 4,336,993 A | 6/1982 | Banton |
| 4,307,932 A | 12/1981 | Winzer | 4,337,993 A | 7/1982 | Kompfner |
| 4,307,933 A | 12/1981 | Palmer et al. | 4,337,995 A | 7/1982 | Tanaka et al. |
| 4,307,934 A | 12/1981 | Palmer | 4,339,170 A | 7/1982 | Winzer |
| 4,307,935 A | 12/1981 | Monnier | 4,339,171 A | 7/1982 | Makuch et al. |
| 4,307,936 A | 12/1981 | Ochiai | 4,339,172 A | 7/1982 | Leather |
| 4,307,937 A | 12/1981 | Gordon | 4,339,200 A | 7/1982 | Corbin |
| 4,309,071 A | 1/1982 | Prunier | 4,339,290 A | 7/1982 | Winzer et al. |
| 4,309,667 A | 1/1982 | Di Forte et al. | 4,339,717 A | 7/1982 | Tsuda et al. |
| 4,310,216 A | 1/1982 | Pellaux | 4,340,272 A | 7/1982 | Papuchon et al. |
| 4,310,217 A | 1/1982 | de Mendez et al. | 4,341,438 A | 7/1982 | Seki et al. |
| 4,310,218 A | 1/1982 | Karol | 4,341,439 A | 7/1982 | Hodge |
| 4,310,849 A | 1/1982 | Glass | 4,341,442 A | 7/1982 | Johnson |
| 4,310,905 A | 1/1982 | Palmer | 4,342,499 A | 8/1982 | Hicks, Jr. |
| 4,311,359 A | 1/1982 | Keller | 4,343,042 A | 8/1982 | Schrock et al. |
| 4,311,726 A | 1/1982 | Hacker et al. | 4,343,532 A | 8/1982 | Palmer |
| 4,312,561 A | 1/1982 | Mead | 4,343,536 A | 8/1982 | Watanabe et al. |
| 4,312,562 A | 1/1982 | Segawa et al. | 4,344,691 A | 8/1982 | Grant et al. |
| 4,312,563 A | 1/1982 | Mead | 4,345,137 A | 8/1982 | Mignien et al. |
| 4,312,564 A | 1/1982 | Cefarelli et al. | 4,345,815 A | 8/1982 | Righini et al. |
| 4,312,571 A | 1/1982 | Ganzhorn | 4,345,816 A | 8/1982 | Nakai et al. |
| 4,313,226 A | 1/1982 | Blackington | 4,346,295 A | 8/1982 | Tanaka et al. |
| 4,313,744 A | 2/1982 | Toda | 4,346,961 A | 8/1982 | Porter |
| 4,314,283 A | 2/1982 | Kramer | 4,348,074 A | 9/1982 | Burns et al. |
| 4,314,740 A | 2/1982 | Bickel | 4,348,075 A | 9/1982 | Gottlieb et al. |
| 4,314,762 A | 2/1982 | Gresko | 4,348,076 A | 9/1982 | Oldham |
| 4,315,666 A | 2/1982 | Hicks, Jr. | 4,351,585 A | 9/1982 | Winzer et al. |
| 4,316,204 A | 2/1982 | Inagaki et al. | 4,351,586 A | 9/1982 | Phillips et al. |
| 4,317,614 A | 3/1982 | Palmer | 4,352,542 A | 10/1982 | Tydings |
| 4,317,615 A | 3/1982 | Herold | 4,352,550 A | 10/1982 | Uchida |
| 4,317,699 A | 3/1982 | Winzer et al. | 4,352,565 A | 10/1982 | Rowe et al. |

| | | | | | | |
|---|---|---|---|---|---|---|
| 4,353,619 A | 10/1982 | Parr | | 4,939,721 A | 7/1990 | De Bosio |
| 4,353,620 A | 10/1982 | Schultz | | 4,939,726 A | 7/1990 | Flammer et al. |
| 4,354,731 A | 10/1982 | Mouissie | | 4,949,390 A | 8/1990 | Iverson et al. |
| 4,354,760 A | 10/1982 | Schiffner | | 4,977,593 A | 12/1990 | Ballance |
| 4,355,321 A | 10/1982 | Yeats | | 4,993,796 A | 2/1991 | Kapany et al. |
| 4,355,862 A | 10/1982 | Kock | | 5,001,702 A | 3/1991 | Teraslinna et al. |
| 4,355,863 A | 10/1982 | Aulich et al. | | 5,007,070 A | 4/1991 | Chao et al. |
| 4,355,864 A | 10/1982 | Soref | | 5,043,938 A | 8/1991 | Ebersole |
| 4,356,395 A | 10/1982 | Miller | | 5,050,164 A | 9/1991 | Chao et al. |
| 4,357,072 A | 11/1982 | Goodfellow et al. | | 5,058,206 A | 10/1991 | Born et al. |
| 4,357,606 A | 11/1982 | Fortescue | | 5,060,275 A | 10/1991 | Hirano |
| 4,358,851 A | 11/1982 | Scifres et al. | | 5,060,305 A | 10/1991 | Prucnal et al. |
| 4,358,858 A | 11/1982 | Tamura et al. | | 5,091,905 A | 2/1992 | Amada |
| 4,359,260 A | 11/1982 | Reinhart et al. | | 5,128,789 A | 7/1992 | Abramovitz |
| 4,359,261 A | 11/1982 | Levi | | 5,130,982 A | 7/1992 | Ash et al. |
| 4,359,262 A | 11/1982 | Dolan | | 5,130,985 A | 7/1992 | Kondo et al. |
| 4,360,246 A | 11/1982 | Figueroa et al. | | 5,136,411 A | 8/1992 | Paik et al. |
| 4,360,247 A | 11/1982 | Beasley | | 5,138,615 A | 8/1992 | Lamport et al. |
| 4,360,248 A | 11/1982 | Bickel et al. | | 5,153,757 A | 10/1992 | Cloonan et al. |
| 4,360,249 A | 11/1982 | Slemon | | 5,153,763 A | 10/1992 | Pidgeon |
| 4,360,921 A | 11/1982 | Scifres et al. | | 5,175,733 A | 12/1992 | Nugent |
| 4,361,380 A | 11/1982 | Marazzi | | 5,181,106 A | 1/1993 | Sutherland |
| 4,362,356 A | 12/1982 | Williams et al. | | 5,187,735 A | 2/1993 | Herrero Garcia et al. |
| 4,362,357 A | 12/1982 | Stockmann et al. | | 5,193,110 A | 3/1993 | Jones et al. |
| 4,362,358 A | 12/1982 | Hafle | | 5,221,152 A | 6/1993 | Chuang |
| 4,362,359 A | 12/1982 | Dammann et al. | | 5,221,983 A | 6/1993 | Wagner |
| 4,362,360 A | 12/1982 | Mannschke | | 5,223,968 A | 6/1993 | Stringer et al. |
| 4,364,633 A | 12/1982 | Verber et al. | | 5,251,205 A | 10/1993 | Callon et al. |
| 4,364,639 A | 12/1982 | Sinclair et al. | | 5,262,906 A | 11/1993 | Mazzola |
| 4,364,640 A | 12/1982 | Kruger et al. | | 5,272,556 A | 12/1993 | Faulkner et al. |
| 4,365,862 A | 12/1982 | Terui et al. | | 5,280,625 A | 1/1994 | Howarter et al. |
| 4,365,863 A | 12/1982 | Broussaud | | 5,289,303 A | 2/1994 | Cloonan et al. |
| 4,365,864 A | 12/1982 | Cowley et al. | | 5,295,133 A | 3/1994 | Jurkevich |
| 4,366,565 A | 12/1982 | Herskowitz | | 5,295,137 A | 3/1994 | Jurkevich |
| 4,380,063 A | 4/1983 | Janson et al. | | 5,297,137 A | 3/1994 | Ofek et al. |
| 4,395,780 A | 7/1983 | Gohm et al. | | 5,303,229 A | 4/1994 | Withers et al. |
| 4,399,531 A | 8/1983 | Grande et al. | | 5,325,223 A | 6/1994 | Bears |
| 4,418,425 A | 11/1983 | Fennel, Jr. et al. | | 5,329,578 A | 7/1994 | Brennan et al. |
| 4,441,186 A | 4/1984 | Erickson | | 5,331,449 A | 7/1994 | Huber et al. |
| 4,450,481 A | 5/1984 | Dickinson | | 5,333,283 A | 7/1994 | Emma et al. |
| 4,470,154 A | 9/1984 | Yano | | 5,341,234 A | 8/1994 | Suzuki et al. |
| 4,479,697 A | 10/1984 | Kapany et al. | | 5,345,444 A | 9/1994 | Cloonan et al. |
| 4,491,983 A | 1/1985 | Pinnow et al. | | 5,349,457 A | 9/1994 | Bears |
| 4,516,272 A | 5/1985 | Yano | | 5,351,146 A | 9/1994 | Chan et al. |
| 4,524,462 A | 6/1985 | Cottatelucci | | 5,353,283 A | 10/1994 | Tsuchiya |
| 4,608,978 A | 9/1986 | Rohr | | 5,355,371 A | 10/1994 | Auerbach et al. |
| 4,621,282 A | 11/1986 | Ahern | | 5,367,636 A | 11/1994 | Colley et al. |
| 4,651,316 A | 3/1987 | Kocan et al. | | 5,377,182 A | 12/1994 | Monacos |
| 4,686,667 A | 8/1987 | Ohnsorge | | 5,381,404 A | 1/1995 | Sugano et al. |
| 4,690,491 A | 9/1987 | Stein et al. | | 5,384,829 A | 1/1995 | Heileman, Jr. et al. |
| 4,695,880 A | 9/1987 | Johnson et al. | | 5,386,466 A * | 1/1995 | Bales et al. ............ 379/221.06 |
| 4,731,878 A | 3/1988 | Vaidya | | 5,396,359 A | 3/1995 | Abramovitz |
| 4,734,907 A | 3/1988 | Turner | | 5,404,241 A | 4/1995 | Ota |
| 4,736,462 A | 4/1988 | Joel, Jr. | | 5,408,464 A | 4/1995 | Jurkevich |
| 4,736,465 A | 4/1988 | Bobey et al. | | 5,418,779 A | 5/1995 | Yemini et al. |
| 4,760,442 A | 7/1988 | O'Connell et al. | | 5,420,857 A | 5/1995 | Jurkevich |
| 4,761,832 A | 8/1988 | Gade et al. | | 5,426,674 A | 6/1995 | Nemirovsky et al. |
| 4,797,882 A | 1/1989 | Maxemchuk | | 5,446,571 A | 8/1995 | Shabeer |
| 4,809,362 A | 2/1989 | Claus et al. | | 5,455,701 A | 10/1995 | Eng et al. |
| 4,809,363 A | 2/1989 | Thinschmidt et al. | | 5,455,865 A | 10/1995 | Perlman |
| 4,821,097 A | 4/1989 | Robbins | | 5,469,283 A | 11/1995 | Vinel et al. |
| 4,829,227 A | 5/1989 | Turner | | 5,477,362 A | 12/1995 | Okamoto et al. |
| 4,830,809 A | 5/1989 | Liebl et al. | | 5,477,364 A | 12/1995 | Pearson |
| 4,872,157 A | 10/1989 | Hemmady et al. | | 5,483,582 A | 1/1996 | Pugh et al. |
| 4,873,517 A | 10/1989 | Baratz et al. | | 5,490,007 A | 2/1996 | Bennett et al. |
| 4,879,712 A | 11/1989 | Littlewood | | 5,491,690 A | 2/1996 | Alfonsi et al. |
| 4,894,818 A | 1/1990 | Fujioka et al. | | 5,491,692 A | 2/1996 | Gunner et al. |
| 4,899,333 A | 2/1990 | Roediger | | 5,499,241 A | 3/1996 | Thompson et al. |
| 4,901,307 A | 2/1990 | Gilhousen et al. | | 5,502,586 A | 3/1996 | Ohnsorge |
| 4,905,219 A | 2/1990 | Barr et al. | | 5,502,587 A | 3/1996 | Frigo |
| 4,914,648 A | 4/1990 | Acampora et al. | | 5,502,719 A | 3/1996 | Grant et al. |

| | | |
|---|---|---|
| 5,504,606 A | 4/1996 | Frigo |
| 5,504,743 A | 4/1996 | Drefenstedt |
| 5,506,713 A | 4/1996 | Okamoto et al. |
| 5,510,923 A | 4/1996 | Philippe et al. |
| 5,519,694 A | 5/1996 | Brewer et al. |
| 5,528,584 A | 6/1996 | Grant et al. |
| 5,528,587 A | 6/1996 | Galand et al. |
| 5,530,575 A | 6/1996 | Acampora et al. |
| 5,532,856 A | 7/1996 | Li et al. |
| 5,535,195 A | 7/1996 | Lee |
| 5,537,239 A | 7/1996 | Sotom et al. |
| 5,539,837 A | 7/1996 | Lindmark |
| 5,539,884 A | 7/1996 | Robrock, II |
| 5,546,390 A | 8/1996 | Stone |
| 5,550,818 A | 8/1996 | Brackett et al. |
| 5,553,060 A | 9/1996 | Obermanns et al. |
| 5,555,477 A | 9/1996 | Tomooka et al. |
| 5,559,624 A | 9/1996 | Darcie et al. |
| 5,559,625 A | 9/1996 | Smith et al. |
| 5,572,347 A | 11/1996 | Burton et al. |
| 5,581,479 A | 12/1996 | McLaughlin et al. |
| 5,589,970 A | 12/1996 | Lyu et al. |
| 5,600,644 A * | 2/1997 | Chang et al. ............... 370/404 |
| 5,600,798 A * | 2/1997 | Cherukuri et al. .......... 709/232 |
| 5,602,841 A | 2/1997 | Lebizay et al. |
| 5,604,682 A | 2/1997 | McLaughlin et al. |
| 5,610,744 A | 3/1997 | Ho et al. |
| 5,610,904 A | 3/1997 | Eng et al. |
| 5,612,953 A | 3/1997 | Olnowich |
| 5,631,908 A * | 5/1997 | Saxe ......................... 370/235 |
| 5,634,011 A | 5/1997 | Auerbach et al. |
| 5,663,818 A | 9/1997 | Yamamoto et al. |
| 5,680,546 A | 10/1997 | Chiaretti et al. |
| 5,748,765 A | 5/1998 | Takhar |
| 5,754,789 A | 5/1998 | Nowatzyk et al. |
| 5,760,935 A | 6/1998 | Sabry et al. |
| 5,761,312 A | 6/1998 | Zelikovitz, deceased et al. |
| 5,790,287 A | 8/1998 | Darcie et al. |
| D405,990 S | 2/1999 | Peng-Hui |
| 5,903,679 A | 5/1999 | Park |
| 5,933,608 A | 8/1999 | Osmon |
| 5,963,351 A | 10/1999 | Kaplounenko et al. |
| 5,995,683 A | 11/1999 | Liu |
| 6,069,720 A | 5/2000 | Cotter et al. |
| 6,081,844 A | 6/2000 | Nowatzyk et al. |
| 6,104,830 A | 8/2000 | Schistad |
| 6,181,679 B1 * | 1/2001 | Ashton et al. .............. 370/244 |
| 6,292,267 B1 | 9/2001 | Mori et al. |

OTHER PUBLICATIONS

A. Anzaloni et al., "Fiber Channel FCS/ATM Interworking: Design and Performance Study", IEEE, 1994.*

W. Seifert, "Bridges and Routers", IEEE Network, Jan. 1998.*

W. Cronin et al., "A Comparison of High Speed LANs", IEEE, 1994.*

RFC 1619, "PPP over SONET/SDH" by W. Simpson, IETF, May 1994.*

("Computer Networks" by Tanenbaum, Prentice–Hall, 1981, pp. 12–13, 187–197.*

"Newton's Telecom Dictionary", $8^{th}$ Edition Harry Newton, 1994, p. 298.*

"Data and Computer Communications", $2^{nd}$ Edition by William Stallings, Macmillan, 1988, p. 202.*

"Data Network Design" by Darren Spohn, McGraw–Hill, 1993, p. 273.*

"Telecommunication Networks: Protocol, Modeling and Analysis" by Mischa Schwartz, Addison–Wesley, 1987, p. 10.*

"Data Networks", $2^{nd}$ Edition by Dimitri Bertsekas et al., Prentice–Hall, 1992, pp. 135–137.*

"Data Communications, Computer Networks and Open Systems", $4^{th}$ Edition by Fred Halsall, Addison–Wesley, 1996, pp. 428 and 499.*

"Internetworking with TCP/IP vol. I", $2^{nd}$ Edition by Douglas Comer, Prentice–Hall, pp. 91–93.*

"Computer Networks" by Andrew Tanenbaum, Prentice–Hall, 1981, pp. 12–13 and 187–197.*

Tannebaum, Andrew, "Computer Networks", Prentice–Hall, 1981, pp. 199–215.*

Marine et al., RFC 1594, FYI on Questions and Answers to Commonly Asked "New Internet User" Questions, IETF, Mar. 1994.*

Pepper, Robert M., "Through the Looking Glass: Integrated Broadband Networks, Regulatory Policies and Institutional Changes," Federal Communication Commission (May 18, 1999).

Kaiser, Peter, John Midwinter and Sadakuni Shimada, "Status and Future Trends in Terrestrial Optical Fiber Systems in North America, Europe. and Japan," IEE Communications Magazine. vol. 25, No. 10 (Oct. 1987).

Ramaswamy, Raju and Clifford V. Eslick, Jr.. "An Evolutionary Approach to the Design of a Metropolitan Area Network to Support B–ISDN Applications." (1990).

"Gigabit Network Testbeds," IEEE (1990).

Glider, George, "Into the Fiberspace," Forbes (Dec. 7, 1992).

Newman, Stagg. JR.. "The Communications Highway of the Future," IEEE Communications Magazine (1988).

Green, Paul E., "The Future of Fiber–Optic Computer Networks," Computer (Sep. 1991).

Herrmann, James J. and Kevin W. Murphy. "Statistical Optical Analysis of Passive Otpical Networks Provides "Plug and Play" Installation with Fiber in the Loop System".

Babaie, Sassan, "How Can Service Providers Future–Proof Themselves Against Competition in the Local Loop?." Loop Access Systems.

Schjetne, Ingunn, "An Economic Way Today of Installing FITL in Cities for POTS and N–ISDN," RON PP.

Ebrahim. Zahir. "A Brief Tutorial on ATM." (Mar. 5, 1992).

Cheung, Nim K., "The Infrastructure for Gigabit Computer Networks," IEEE Communication Magazine (Apr. 1992).

Walters, Stephen M., David S. Burpee. and George H. Dobrowski, "Evolution of Fiber Access Systems to ATM Broadband Networking." Proceedings of the IEEE, vol. 81, No. 11 (Nov. 1993).

Wardlow, M.I. R. Rowley, W. Wade. T. J. King, J. Chauhan, "ATM Network Components—The Service Access Switch and the Link Multiplexer".

Mordecai, B. A., A. B. Walsh. J. Isganitis. C. G. Omidyar, "Towards Flexible Operations Communications For Switched Multi–Megabit Data Service," IEEE (1998).

Jennings, Tate B., Joseph C. Lawrence, Kaj Tesink, "Practical SMDS Demonstrations," IEEE (1992).

Biersack, Ernest W., C. Cotton, D. Feldmeier. A. McAuley and W. Sincoskie. "Gigabit Networking Research at Bellcore," IEEE (Mar. 1992).

Clark, David D., B. Davie, D. Faber. I. Gopal, B. Kadaba, W. Sincoskie, J. Smith, and D. Tennenhouse. "An Overview of the Aurora Gigabit Testbed," IEEE (1992).

Laik, Gail R., B. Davie, W. Marcus. and K. Young. Jr.. "An OC–12/STS–3c/ATM Interface for Gigabit Network Applications." IEEE (1992).

Cidon, Israel, Inder Gopal. and Roch Guerin. "Bandwidth Management and Congestion Control in plaNET," IEEE Communications Magazine (Oct. 1991).

Gopal, Inder, and Roch Guerin, Network Transparency: The plaNET Approach. IEEE (1994).

Berenbaum. Alan. Joe Dixon. Anand Iyengar. Srinivasan Keshav. "A Flexible ATM–Host Interface for Xunet II." IEEE Network (Jul. 1993).

"AT&T to enhance 500–mile fiber network with erbium amplifiers." Phillips Business Information, Inc. (1993).

Fraser, A. G., C. R. Kalmanek, A. E. Kplan, W. T. Marshall. R. C. Restrick, "XUNET 2: A Nationwide Testbed in High- –Speed Networking." Infocom (1992).

Olsen. Robert T.. Lawrence H. Landweber, "Design and Implementation of a Fast Virtual Channel Establishment Method for ATM Networks," IEEE (1993).

Karpinski, Richard, "AT&T, Ameritech Partner in Sonet." Telephony Publishing Corp (Apr. 8, 1991).

"AT&T Bell Laboratories Researchers to Describe Lucky-net." PR Newswire (1991).

R. D. Gitlin, T. B. London, L. J. Greenstein, and S. R. Ahuha, "LuckyNet: An Overview." Globecom 91 (1991).

Tseng, Chong–Wei and Bor–Uei Chen, "D–NET, A New Scheme for High Data Rate Optical Local Area Networks." IEEE Journal on Selected Areas in Communications, vol. SAC–1, No. 3 (Apr. 1983).

Rawson, Eric G., "The Fibernet II Ethernet–Compatible Fiber–Optic LAN." IEEE (1985).

Jain, Raj, "FDDI: Current Issues and Future Plans." IEEE Communications Magazine (Sep. 1993).

King, Timothy J.. "The Fibre Distributed Data Interface (FDDI)—A New Generation Standard for Local Area Netwroks." IEEE (1988).

Karttunen, Jari, "FDDI Technology in a Public Backbone Network." IEEE (1989).

Smith, William, "Service Concepts and Plans for Broadband Network Deployment in BellSouth," IEEE (1998).

Stevenson, Daniel S. and Julian G. Rosenman. "VISTAnet Gigabit Testbed," IEEE 1992.

Aimite, Allan, Sonia Dyer, Dariush Habibi. Richard Hanke, and John Thielen, "Design Issues in the Development of a National Fiber–Optic Transmission Network," IEEE (1988).

White, Albert L., "US Sprint's High Capacity. Long–Haul Fiber Network," IEEE (1988).

Woods, Jack T., "Performance Monitoring of Digital Networks," IEEE (1991).

Swanbury. Adam R., "Optimum and Suboptimum Tree Computation for Interconnected Multiple–Access Networks." IEEE (1992).

Mazranni, Tony Y. and Grudatta. M. Parulkar, "Performance Analysis of the Ethernet Under Conditions of Bursty Traffic".

Singh, Dilip. "Requirements for Service Delivery and Service Assurance Platforms in an Open Systems Based Advanced Intelligent Network".

Lisowski, Ben and Louise Reingold. "Sprint's Evolution to Broadband ISDN," IEEE (1992).

Cisco Systems. Inc.. 1991 Annual Report.

Miki. Tetsuya. "Optical Transport Networks." Proceedings of the IEEE. vol. 81, No. 11 (Nov. 1993).

Eskow, Dennis, "ATM gaining in internetworking race: wide area communications," Corporate Computing (Apr. 1993).

Yeager. Scott, "Introduction of MFS LAN and High Speed Connectivity Product Offering," Metropolitan Fiber Systems, Jul. 1991.

"Full Speed Ahead for LAN Interconnect," Data Communications (Jan. 1993).

First Maps of the Internet.

Yaplee. Jeffery and Robert O. Denney, "Building a Large Network at The Boeing Company." IEEE (1998).

Krauss. Howard. "Boeing Enterprise Network: United Transport Architecture." (Oct. 7, 1991).

"Order from *Markman* Hearing," Order in *Red River Fiber–Optic Corp., Inc.* v. *Level 3 Communications, LLC,* Case No. 2:01–CV–208 (TJW), U.S. District Court for the Eastern District of Texas, Mar. 26, 2003.

"Definition of Intelligent Line Module," Order in *Red River Fiber–Optic Corp., Inc.* v. *Level 3 Communications, LLC,* Case No. 2:01–CV–208 (TJW), U.S. District Court for the Eastern District of Texas, Mar. 27, 2003.

"A Brief History of the Internet." Internet Society.

Zakon, Robert H.. "RFC 2235: Hobbe's Internet Timeline," Network Working Group (Nov. 1997).

Baran. Paul. "On Distributed Communications." The Rand Corporation (1964).

Marill, Thomas and Lawerence G. Roberts. "Tward a Comparative Network of Time–Shared Computers".

Hedrick, C., "RFC 1058: Routing Information Protocol," Network Working Group (Jun. 1988).

"A History of Video Conferencing (VC) Technology".

Cohen, Danny, "RFC 741: Specifications for the Network Voice Protocol".

Skene, Jerry, "IP and Next Generation Networks".

Cole. Randy, "PVP—A Packet Video Protocol." Information Science Institute, University of Southern California (Aug. 11, 1981).

"Microsoft Delivers First Beta Release of Netmeeting 2.0; Integrated Support of ITU H.323 Standard Paves the Way for Rich Communication on the Internet." Microsoft (Oct. 14, 1996).

Malamud. C., RFC 1529: Principles of Operation for the PTC, TNT Subdomain: Remote Printing—Administrative Policies. Network Working Group (Oct. 1993).

Hecht. Jeff, "A Fiber–Optic Chronology".

The Story of Sprint, Sprint.

Ahmed, Syed and Jay Winder. "An Intro to SONET".

"Request for Information for a High Speed Data Network for Harvard University" Harvard University (1988).

Madron. Thomas W., *LANS Applications of IEEE/ANSI 802 Standards.* pp. 59–60. 206–207, John Wiley & Sons (1989).

Braden, R. and J. Postel, "RFC 1009: Requirements for Internet Gateways." Network Working Group (Jun. 1987).

Hardwick, K. and J. Lekashman, "RFC 1044: Internet Protocol on Network Systems HYPERchannel Protocol Specifications." Network Working Group (Feb. 1988).

Leiner, B., "RFC 1077: Critical Issues in High Bandwidth Networking." Gigabit Working Group (Nov. 1988).

Partridge, C., "RFC 1152: Workshop Report Internet Research Steering Group Workshop on Very–High–Speed Networks," Network Working Group (Apr. 1990).

Edmond; W., "RFC 1221: Host Access Protocol (HAP) Specifications—Version 2," Network Working Group (Apr. 1991).

Kapor, M., "RFC 1259: Building the Open Road: The NREN as Test–Bed for the National Public Radio." Network Working Group (Sep. 1991).

Vecchi. Mario P., "Internet Draft: IPng Requirements: a cable television industry viewpoint," (Feb. 28, 1994).

The Coming of the Fibersphere. Forbes (Dec. 7, 1992).

Van, Joe, "Fiber optics 2–edged sword for telephone companies." Chicago Tribune (Apr. 18, 1993).

Hume, Brit, "George Gilder and the Vision of a Networked World," The Washington Post (Jul. 16, 1992).

Coy, Peter, "Books: Liberation Technology," Business Week (Oct. 12, 1992).

Bradnew. Scott. "Case Studies," Interop, Inc. (1991).

Bradnew. Scott. "Building Data Networks with Bridges and Routers," Interop, Inc. (1993).

LMAnet, Harvard University.

Neff. Raymond K. and Peter J. Haigh. "CWRUnet—Case History of a Campus–Wide Fiber–to–the–Desktop Network." Case Western University (1992).

Bradner. Scott. "INTEROP 90: Application of Bridges and Routers: Network Design and Product Survey." Interop. Inc. (1990).

Bradner. Scott. "INTEROP 91: Application of Bridges and Routers: Network Design and Product Survey." Interop. Inc. (1991).

Bradner. Scott. "Jargon Busting: An Introduction to the Technology of Data Networks." Harvard Office of Information Technology (Nov. 8, 1992).

Bradner. Scott. INTEROP 93: Building Data Networks with Bridges and Routers. Interop Europe (1993).

"Specifications for a Campus Communications Network for Case Western Reserve University." Case Western Reserve University (Nov. 7, 1988).

Picture of Faceplate Assembly, Case Western Reserve University.

CWRUNET Status as of Jun. 23, 1994, Case Western Reserve University.

Miscellaneous CWRUNET Materials: Construction Materials Analysis as of Jun. 23, 1994, Circuit Board, Ethernet Frame Format, NB20E and NB25E Two Port Ethernet Bridges User's Guide, Intelligent Repeater Bridging Module (IRBM) Installation Guide.

CWRU Networks User Guide—Website Pages Printout. Case Western Reserve University.

CWRUnet News Archive Printout, Case Western Reserve University.

"CWRUnet Architecture Planning." CWRUnet Services Engineering—Case Western Reserve University (Jan. 30, 2003).

Information/Specifications on PowerHub 7000/8000 LAN Backbone Switch, Fore Systems (1998).

"Routing Services Basic Configuration Guide." Cableton Systems (1994).

"IRBM/LM Local Management for the Cableton Systems IRBM User's Manual." Cabletron Systems (Mar. 1991).

CD #1 with "History of Dream" Movie, Case Western Reserve University: and CD #1 with "Learning at Speed of Light" Movie. Case Western Reserve University.

CD #2 with "Fiber Optic Tutorial." Corning (1992).

Neff, Raymond K. and Peter J. Haigh, "CWRUnet—Case History of a Campus–Wide Fiber–to–the–Desktop Network," Cause Effect (Summer 1992).

"MMAC–M8FNB Multi–Media Access Center Overview and Setup Guide." Cabletron Systems (Oct. 1993).

"EMME (Ethernet Management Module with Ethernet." Cabletron Systems.

"Repeater Media Interface Modules (TPRMIM/FORMIM/CXRMIM) Installation Guide," Cabletron Systems (Jul. 1992).

"EMM–E6 Local Management Guide," Cabletron Systems (Jan. 1994).

"EMM–E6 Local Installation Guide," Cabletron Systems (Jan. 1994).

"FOMIM Fiber Optic Media Interface Module Installation Guide." Cabletron Systems (Nov. 1990).

"Desktop Network Interface Card: E2000 Series Installation Guide," Cabletron Systems (Sep. 1990).

"Multi Media Access Center Products Catalog." Cabletron Systems.

CWRUnet System Architecture and Connections (1988–1989).

Neff, Raymond K., "Fiber Optic Networking on Campus." Feature (Feb. 1991).

"A Monunmental Invitation," Case Western Reserve University (1989).

"FOT–1 Fiber Optic Transceiver User's Manual." Cabletron Systems (Jul. 1998).

"The INS Help Desk," Case Western Reserve University (Aug. 15, 1990).

"Fiber Optic Media Interface Module (FOT–MIM) Installation Guide," Cabletron Systems (Oct. 21, 1988).

"Intelligent Repeater Modules (IRM/IRM–1) Installation Guide," Cabletron Systems (Jan. 18, 1989).

"Synoptics LattisNet." Anixter Bros. Inc. (1988).

"Guide to Fiber Optics System Design," Belden Wire and Cable.

Alexander, Stephen B. et al, "A Precompetitive Consortium on Wide–Band All Optical Networks." Journal of Light Wave Technology, vol. 11. No. 5/6 (May/Jun. 1993).

Berstein, Simon. "Payload Management, Sprint International Communications".

Woods. Jack T., "IT Networking—Past, Present, Future," IEEE Proceedings (1999).

Rider. M. J., "Protocols for ATM Access Networks." IEEE (1988).

Arms, Caroline, *Campus Networking Strategies,* pp. 206–227, Digital Press (1988).

*Red River Fiber–Optic Corporation, Inc.* v. *Level 3 Communications LLC;* US District Court of the Eastern District of Texas; Civ Action # 2–01CV208TJW; Exhibit A to Joint Claim Construction Statement; Agreed Claim Term Interpretations.

*Red River Fiber–Optic Corporation, Inc.* v. *Level 3 Communications LLC;* US District Court of the Eastern District of Texas; Civ Action # 2–01CV208TJW; Exhibit B to Joint Claim Construction Statement; Disputed Claim Term Interpretations for Each Party.

Requested Claim Construction in Reexamination Request of Patent No. 5,555,478.

Stallings, William; *Data and Computer Communications* $2^{nd}$ *ed*; Maximillan Publishing (1989).

Perlman, Radia; *Intercommunications: Bridges and Routers;* Addison–Wesley Publishing Company (1992).

Martin, James; Computer Networks and Distributed Processing Software, Techniques, and Architecture; Prentice–Hall (1981).

Stallings, William; Handbook of Computer Communications Standards, 2nd Ed.; MacMillan Computer Publishing (1990).

Fraser, A.G.; C.R. Kalmanek; A.E. Kaplan; W.T. Marshall; R.C. Restrick; "XU–NET: A Nationwide Testbed in High–Speed Networking"; IEEE Infocom (1992).

Jajszczyk, Andrzej and H.T. Mouftah; "Photonic Fast Packet Switching"; IEEE Communication Magazine (Feb. 1993).

Rawson, Eric G.; "The Fibernet II Ethernet–Compatible Fiber–Optic LAN", Journal of Lightwave Technology (Jun. 1985).

Shibagaki, Taro; Hiroyuki Ibe and Takeshi Ozeki; "Video Characteristics in UDM Star Networks"; Journal of Lightwave Technology (Jun. 1985).

Minowa, Junichiro; Nobuyuki Tokura and Kiyushi Nosu; "Development of Fiber–Optic Local Area Networks in Japan"; Journal of Lightwave Technology (Jun. 1985).

Rosenberger, D. and H.H. White; "Optical LAN Activities in Europe"; Journal of Lightwave Technology (Jun. 1985).

Personick, Stewart D.; "Protocols for Fiber–Optic Local Area Networks"; Journal of Lightwave Technology (Jun. 1985).

Oshima, Kazuyoshi; Tadayoshi Kitayama; Masateru Yamaki; Teruhito Matsui and Katsuyoshi Ito; "Fiber–Optic Local Area Passive Network Using Burst TDMA Scheme"; Journal of Lightwave Technology (Jun. 1985).

Hakamada, Yoshiro and Kimio Oguchi; "32–Mbit/s Star Configured Optical Local Area Network Design and Performance"; Journal of Lightwave Technology (Jun. 1985).

Imai, Mitsumo; Heiki Takagi and Koichi Nakatani; "Development of Medium–/Small–Scale Local Area Optical Fiber Loop Network"; Journal of Lightwave Technology (Jun. 1985).

Albert, Bernhard and Anura P. Jayasumana; *FDDI and FDDI–II, Architecture, Protocols, and Performance;* Artech House (1994).

Davidson, Robert P. and Nathan J. Muller, *Internetworking LANs Operation, Design, and Management,* Artech House (1992).

Green, Paul E., "The Future of Fiber–Optic Computer Networks", IEEE (1991).

Green, P. E.; "An All–Optical Computer Network: Lessons Learned"; IEEE Network: The Magazine of Computer Communications (Mar. 1992).

Bannister, Joseph, Marlo Gerla and Milan Kovacevic; "An All–Optical Multifiber Tree Network"; Journal of Lightwave Technology (May/Jun. 1993).

Acampora, Anthony S. and Mark J. Karl; "An Overview of Lightwave Packet Networks"; IEEE Network: The Magazine of Computer Communications (Jan. 1989).

Marks, Jill; "Fiber System for High–Rises: An Urban Problem–Solver"; TVO: The Business Magazine for Cable Operators (Aug. 1, 1981).

Lewis, K.H and D.M. Buck; "Lightwave System Design: Part One of Three Parts"; Telephony (Dec. 12, 1983).

Lewis, K.H and D.M. Buck; "Lightwave System Design: Part Two of Three Parts"; Telephony (Jan. 9, 1984).

Lewis, K.H and D.M. Buck; "Lightwave System Design: Part Three of Three Parts"; Telephony (Feb. 20, 1984).

Kao, Charles (ed); Optical Fiber Technology, II; IEEE Press (1981).

Leiner, B. "RFC 1077: Critical Issues in High Bandwidth Networking"; Network Working Group (Nov. 1988).

Partridge, Craig; "RFC 1152: Workshop Report Internet Research Steering Group Workshop on Very–High Speed Networks"; Network Working Group (Apr. 1990).

Bradner, Scott; "Interop 90: Application of Bridges and Routers: Network Design and Product Survey"; Interop, Inc. (1990).

Zelikovitz, Joseph, compilation, "Background Papers".

Zelikovitz, Joseph, "Fiber Optic Interface Device Couplers: Patent Evaluation for Datacrown, Inc." (Aug. 1, 1983).

Zelikovitz, Joseph, "Coupler Patent Activity in the Fiber Optic Industry" (Oct. 1981).

Zelikovitz, Joseph, Boyd, Michael "Kaptron Fiber Optics Devices" (Jan. 15, 1981).

Zelikovitz, Joseph, Telecommunications/Investment and Business Strategy: Basic Design Variables (Aug. 28, 2984).

Zelikovitz, Joseph, "Competitive Analysis Report–Kaptron," (Sep. 1981).

Kent, Alah H., Mini–Hub System.

Deposition testimony of *Scott O. Bradner, Red River Fiber–Optic Corp.,* v. *Level 3, E.D. Tex.,* 2002. *Case No.: 2–01CV208–TJM.*

Deposition testimony of *Peter A. Steenskiste, Red River Fiber–Optic Corp.,* v. *Level 3, E.D. Tex.,* 2002. *Case No.: 2–01CV208–TJM.*

Abstract Listing, IFI/Plenum Data Corp. (1994), pp. RR002150–RR002172.

Case Western Reserve University Network (CWRUNet) Design Diagram, Case Western Reserve University.

CWRUNet Open Forum Documents Showing Transition of IP Routed CWRUNet in Jan. 3, 2001, Case Western Reserve University.

Miscellaneous CWRUNet Design Documents, Case Western Reserve University.

Case Western Reserve University SER Documents, Case Western Reserve University.

EMM/Cabletron Documents.

NEFF, Raymond K. and Peter J. Haigh; "Case History of a Campus–Wide Fiber–to–the–Desktop Network." Case Western Reserve University, 1992.

"What presidents Needs to Know About the Impact of Networking on Campus," Higher Education Information Resoruces Alliance, 1993.

Wakins, Beverly T.: "University Hopes Campus Wide Network Will Help Give It Competitive Edge;" The Chronicle of Higher Education: Apr. 29, 1992.

Haigh, Peter J.: "LANs and Fiber Optics: Building a New Infrastructure in Higher Education:" Higher Education Product Companion.

Compact Disk 1 with Optical Fiber for Premises Wiring Tutorial, Corning, 1992.

Compact Disk 2 with "Optical Fiber for Premises Wiring Tutorial," Corning, 1992.

Order date Mar. 26, 2003; *Red River Fiber–Optic Corp., Inc.* v. *Level 3 Communications, LLC;* No. 2:01–CV–208 (TJW); U.S. Dist. Ct. for the Eastern District of Tx—Marshall Division.

"Court's Claim Construction Statement Civil Action No. 2–01–CV–208–TJW;" *Red River Fiber–Optic Corp., Inc.* v. *Level 3 Communications, LLC;* No. 2:01–CV–208 (TJW); U.S. Dist Ct for the Eastern District of Tx—Marshall Division.

"Architecture Change Affects All Computers Connected to CWRUnet," Case Western Reserve University (2000).

"IP Routing Frequently Asked Questions," Case Western Reserve University (Dec. 28, 2000).

"Static IP FAQ," Case Western Reserve University (Dec. 28, 2000).

"IP Routing Open Forum—Q & A—Apr. 20, 2000," Case Western Reserve University (Apr. 20, 2000).

"Network Numbering Scheme," Case Western Reserve University (Apr. 20, 2000).

"Routing TCP/IP on CWRUnet," Case Western Reserve University (Apr. 20, 2000).

"CWRUnet Status," Case Western Reserve University (Oct. 26, 2000).

"IP Routing Information Center," Case Western Reserve University (Jan. 5, 2001).

Robert P. Davidson and Nathan J. Muller, "Inter–Networking LANs: Operation, Design, and Management," 1992, Artech House, Inc., Norwood, MA, USA.

Radia Perlman, "Interconnections: Bridges and Routers," 1992, Addison–Wesley Publishing Company, USA.

Bernhard Albert and Anura P. Jayasumana, "FDDI and FDDI–II: Architecture, Protocols, and Performance," 1994, pp. 1–146, Artech House, Inc., Norwood, MA, USA.

* cited by examiner

1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 2 is confirmed.

Claims 3, 5, 10–12 and 16 are determined to be patentable as amended.

Claims 4, 6–9, 13–15 and 17–20, dependent on an amended claim, are determined to be patentable.

3. The fiber optic transmission system of claim 1 further comprising:
  a second intelligent communication platform coupled to [said] *a* second intelligent line module coupled to said second data processor line card wherein said second intelligent communication platform is capable of receiving any one of said transmission packets, determining the appropriate route for said one transmission packet and shunting said one transmission packet onto the appropriate fiber optic line to or away from said second intelligent data processor line card.

5. The fiber optic transmission system of claim 3 further comprising:
  wherein the *second* intelligent communication platform possesses a memory function allowing the *second* intelligent communication platform to recognize related transmission packets for the same transmission from the same location and directed to the same destination for routing in a similar manner as the initial transmission packet in the transmission stream.

10. A fiber optic transmission system comprising:
  a plurality of fiber optic lines, subscriber locations, intelligent communication platforms, and at least one intelligent routing card;
  a first source of data at a first subscriber location;
  a first data processor line card at said first subscriber location capable of forming a plurality of transmission packets each with data, header and tail information;
  a first intelligent communication platform coupled to said first data processor line card by fiber optic lines wherein said first intelligent communication platform is capable of receiving any one of said transmission packets, determining the appropriate route for said one transmission packet and shunting said one transmission packet onto the appropriate fiber optic line;
  a first intelligent module coupled to said intelligent communication platform by fiber optic lines wherein said first intelligent line module is capable of receiving any one of said transmission packets, determining the appropriate route for said one transmission packet and is capable of shunting said one transmission packet onto the appropriate fiber optic line to or away from said first intelligent communication platform;

a first intelligent routing card at the junction of at least two fiber optic lines and coupled to said first intelligent line module wherein said first intelligent routing card is capable of receiving any one of said transmission packets, determining the appropriate route for said one transmission packet and shunting said one transmission packet onto the appropriate fiber otpic line to or away from said first intelligent line module;
  a second intelligent line module coupled to said first intelligent routing card wherein said second intelligent line module is capable of receiving any one of said transmission packets, determining the appropriate route for said one transmission packet and shunting said one transmission packet onto the appropriate fiber optic line to or away from said first intelligent routing card;
  a second intelligent communication platform coupled to said second intelligent line module [coupled to said second intelligent line module] wherein said second intelligent communication platform is capable of receiving any one of said transmission packets, determining the appropriate route for said one transmission packet and shunting said one transmission packet onto the appropriate fiber optic line to or away from said second intelligent line module; and
  a second data processor line card at a second subscriber location coupled to said second intelligent communication platform wherein said second data processor line card is capable of receiving said one transmission packet and decoding the data within said transmission packet.

11. The fiber optic transmission system of claim 10 further comprising:
  wherein the *first* intelligent communication platform possesses a memory function allowing the *first* intelligent communication platform to recognize related transmission packets for the same transmission from the same location and directed to the same destination for routing in a similar manner as the initial transmission packet in the transmission stream.

12. The fiber optic transmission system of claim 10 further comprising:
  wherein the *first* intelligent line module possesses a memory function allowing the *first* intelligent line module to recognize related transmission packets for the same transmission from the same location and directed to the same destination for routing in a similar manner as the initial transmission packet in the transmission stream.

16. The method of routing calls on a fiber optic network having a plurality of fiber optic lines, subscriber locations, intelligent communication platforms, and at least one intelligent routing card, comprising the steps of:
  initializing a first and second intelligent line card data processor, a first and second intelligent communication platform, a first and second intelligent line module, and a intelligent routing card;
    forming a transmission packet at a first subscriber location with the first intelligent line card [dam] *data* processor wherein said transmission packet possesses header information, data information and tail information;
    transmitting the transmission packet from the first intelligent line card data processor to said first intelligent communication platform where the destination of the transmission packet is determined and the routing determination is made;
    routing the transmission packet from the first intelligent communication platform to an intelligemt line module where the destination of the transmission packet is determined and the routing determination is made;

routing the transmission packet from the first intelligent line module to said intelligent routing card where the destination of the transmission packet is determined and the routing determination is made;

routing the transmission packet from the intelligent routing card to the second intelligent line module where the destination of the transmission packet is determined and the routing determination is made;

routing the transmission packet from the second intelligent line module to the second intelligent communication platform where the destination of the transmission packet is determined and the routing determination is made;

routing the transmission packet from the second intelligent communication platform to the second intelligent line card which is the destination of the transmission so that the transmission packet can be decoded.

* * * * *